United States Patent
Suzuka

(10) Patent No.: US 9,020,334 B1
(45) Date of Patent: Apr. 28, 2015

(54) IMAGING APPARATUS

(71) Applicant: Hoya Corporation, Tokyo (JP)

(72) Inventor: Shinya Suzuka, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 14/513,627

(22) Filed: Oct. 14, 2014

(30) Foreign Application Priority Data

Oct. 17, 2013 (JP) ................. 2013-216614

(51) Int. Cl.
*G02B 27/64* (2006.01)
*G02B 13/00* (2006.01)

(52) U.S. Cl.
CPC .......... *G02B 27/646* (2013.01); *G02B 13/0015* (2013.01)

(58) Field of Classification Search
CPC ............. G02B 26/646; G02B 13/0015; G02B 13/0065; G03B 5/00; G03B 2205/0007; H04N 5/23248; H04N 5/23287
See application file for complete search history.

(56) References Cited

U.S. PATENT DOCUMENTS

| 8,837,929 | B2 | 9/2014 | Nomura et al. | |
|---|---|---|---|---|
| 2006/0127073 | A1 | 6/2006 | Yasuda | |
| 2006/0268431 | A1* | 11/2006 | Jin ................. | 359/726 |
| 2007/0133967 | A1* | 6/2007 | Takahashi et al. ............. | 396/55 |
| 2008/0152333 | A1* | 6/2008 | Yamasaki et al. ............. | 396/55 |
| 2008/0266404 | A1 | 10/2008 | Sato | |
| 2011/0158621 | A1 | 6/2011 | Honsho et al. | |
| 2011/0181740 | A1 | 7/2011 | Watanabe et al. | |
| 2011/0267712 | A1 | 11/2011 | Umeda et al. | |
| 2013/0278785 | A1 | 10/2013 | Nomura et al. | |
| 2014/0086569 | A1* | 3/2014 | Nomura et al. ............. | 396/55 |
| 2014/0218798 | A1 | 8/2014 | Suzuka | |
| 2014/0218799 | A1* | 8/2014 | Suzuka ......................... | 359/557 |

FOREIGN PATENT DOCUMENTS

| JP | 2006-166202 | 6/2006 |
|---|---|---|
| JP | 2006-259247 | 9/2006 |
| JP | 2006-330439 | 12/2006 |
| JP | 2007-228005 | 9/2007 |
| JP | 2008-268700 | 11/2008 |
| JP | 2009-086319 | 4/2009 |
| JP | 2010-128384 | 6/2010 |

(Continued)

OTHER PUBLICATIONS

U.S. Appl. No. 14/513,666 to Shinya Suzuka, filed Oct. 14, 2014.

(Continued)

*Primary Examiner* — W B Perkey

(74) *Attorney, Agent, or Firm* — Greenblum & Bernstein, P.L.C.

(57) ABSTRACT

An imaging apparatus includes an anti-shake system provided with a guide portion which guides a movable frame, supporting a front lens element, to linearly move and rotate about a rotational axis, in a plane orthogonal to an optical axis of the front lens element, relative to a base member, which supports a reflector element; and first and second actuators which generate driving forces to move the movable frame in two mutually-intersecting directions. The distance from the rotational axis of the guide portion to the point of intersection of first and second planes, which respectively pass through centers of the first and second actuators and extend in the two mutually-intersecting directions, is greater than a distance from the rotational axis of the guide portion to the optical axis of the front lens element.

5 Claims, 14 Drawing Sheets

(56) References Cited

FOREIGN PATENT DOCUMENTS

| | | |
|---|---|---|
| JP | 2010-204341 | 9/2010 |
| JP | 2011-028029 | 2/2011 |
| JP | 4717529 B2 | 4/2011 |
| JP | 2011-100045 | 5/2011 |
| JP | 4789655 B2 | 7/2011 |
| JP | 2011-154347 | 8/2011 |
| JP | 2011-154365 | 8/2011 |

OTHER PUBLICATIONS

U.S. Appl. No. 14/513,684 to Shinya Suzuka, filed Oct. 14, 2014.

* cited by examiner

IMAGING APPARATUS

BACKGROUND OF THE INVENTION

1. Field of the Invention

The present invention relates to an imaging apparatus equipped with an anti-shake (image shake correction/image stabilizing/shake reduction) system.

2. Description of the Related Art

In recent years, mobile electronic devices which are designed mainly for taking still/moving photographic images, such as digital cameras (still-video cameras) and digital camcorders (motion-video cameras), and other mobile electronic devices which are designed to be capable of taking such photographic images as a subsidiary function, such as mobile phones equipped with a camera and smart devices (smart phones or tablet computers, etc.) equipped with a camera, have become widespread, and there has been a demand to miniaturize the imaging units incorporated in these types of mobile electronic devices. In order to miniaturize an imaging unit, it is known to construct an optical system of an imaging unit out of a bending optical system which reflects (bends) light rays using a reflecting surface of a reflector element such as a prism or a mirror. Using a bending optical system in an imaging unit makes it possible to achieve a reduction in thickness of the imaging unit, especially in the direction of travel of the incident light emanating from an object which is to be photographed.

In addition, there is a demand for imaging units to be equipped with a so-called anti-shake (image shake correction/image stabilizing/shake reduction) system that is designed to reduce image shake on an image plane that is caused by vibrations such as hand shake. The following four different types of imaging units are known in the art as imaging units using a bending optical system which are equipped with an anti-shake system: a first type (disclosed in Japanese Unexamined Patent Publication Nos. 2009-86319 and 2008-268700) in which an image sensor is moved in directions orthogonal to an optical axis to reduce image shake, a second type (disclosed in Japanese Unexamined Patent Publication No. 2010-128384 and Japanese Patent No. 4,789,655) in which a lens disposed behind a reflector element (on the image plane side) that has a reflecting surface is moved in directions orthogonal to an optical axis to reduce image shake, a third type (disclosed in Japanese Unexamined Patent Publication Nos. 2007-228005, 2010-204341, 2006-330439, and Japanese Patent No. 4,717,529) in which the angle of a reflector element (a reflecting surface thereof) and the angle of a lens adjacent to the reflector element are changed to reduce image shake, and a fourth type (disclosed in Japanese Unexamined Patent Publication Nos. 2006-166202 and 2006-259247) in which the entire imaging unit is tilted/inclined to reduce image shake.

An anti-shake system using voice coil motors (VCMs), which generate force (driving force) by application of a current (voltage) across the terminals of the coil positioned inside the magnetic field of a permanent magnet, for driving an optical element (anti-shake optical element) to reduce image shake is known in the art (disclosed in Japanese Unexamined Patent Publication Nos. 2009-86319, 2010-128384, 2007-228005, and Japanese Patent No. 4,789,655). Information on the position of the anti-shake optical element can be obtained with sensors (e.g., Hall sensors) that measure the change in the magnetic field.

The first type of anti-shake system tends to become complicated in structure and tends to increase in cost because a circuit board connected to the image sensor is moved in order to follow movements of the image sensor, which requires electrical components that are provided around the image sensor to also be movable components in addition to the image sensor. In addition, the periphery of the imaging surface of the image sensor is required to be dust tight; however, in small imaging units intended for being incorporated into a mobile phone or a smart device (such as a smartphone, a tablet computer or smart glasses, etc.), it is difficult to secure sufficient space for allowing the image sensor to perform an anti-shake (image shake correction/image-stabilizing/shake reduction) operation while maintaining the dust-tight structure of the image sensor.

The second type of anti-shake system has a structure such that the moving direction of the lens group, disposed behind the reflector element, during an anti-shake operation corresponds to the direction of the thickness of the imaging unit (i.e., the forward/rearward direction of the imaging unit, wherein the direction toward an object to be photographed refers to the forward (front) direction of the imaging unit), and hence, there is a problem with providing enough space to house such an anti-shake structure in a slimmed-down imaging unit. In other words, the slimming-down of the imaging unit is limited if this type of anti-shake system is used. There is a similar problem also in the type of anti-shake system in which an image sensor is moved, instead of a lens group, in the direction of the thickness of the imaging unit.

The third type of anti-shake system requires a large space for allowing the reflector element and the lens group to tilt/incline, and accordingly, the imaging unit is easily enlarged in size. The fourth type of anti-shake system requires a larger space for allowing the entire imaging unit to be tilted/inclined to reduce image shake.

Accordingly, there has been a demand for an anti-shake system that utilizes a different manner for driving an anti-shake optical element from those of the above described types of imaging units and that is advantageous for miniaturization and slimming of the imaging apparatus. A mechanism which supports the anti-shake optical element and a device which gives a driving force to the anti-shake optical element, in particular, have been desired to be simple and compact in size. Additionally, a downsized drive mechanism is also limited in structure and power output of an actuator(s) incorporated therein, thus being required to achieve high-efficient driving.

SUMMARY OF THE INVENTION

The present invention has been devised in view of the above mentioned drawbacks and provides an imaging apparatus which is equipped with an anti-shake system and in which a bending optical system forms an optical path, wherein miniaturization of the anti-shake system and an improvement in efficiency of driving the anti-shake optical element are achieved.

In an embodiment, an imaging apparatus is provided, including a front lens group which constitutes part of an imaging optical system of the imaging apparatus and is provided at a fixed position with respect to an optical axis direction, wherein the front lens group includes at least one front lens element and a reflector element, in that order from an object side, and wherein light rays exiting from the front lens element along a first optical axis are reflected by the reflector element to travel along a second optical axis that is nonparallel to the first optical axis; at least one rear lens group which constitutes another part of the imaging optical system and is provided closer to an image plane than the front lens group; and an anti-shake system which drives the front lens element along a plane orthogonal to the first optical axis, in response to vibrations applied to the imaging optical system, to reduce image shake on the image plane. The anti-shake system includes a base member which supports at least the reflector element of the front lens group; a movable frame which supports the front lens element of the front lens group and is supported to be movable relative to the base member along a plane orthogonal to the first optical axis; a guide portion which guides the movable frame relative to the base member so as to allow the movable frame to move back and forth in a predetermined linear direction and rotate about a predetermined rotational axis; and a first actuator and a second actuator which generate a driving force for moving the movable frame in a first direction and in a second direction, respectively, the first direction and the second direction intersecting each other in the plane orthogonal to the first optical axis. A first section and a second section are defined on either side of a second reference plane, which passes through the first optical axis and is orthogonal to a first reference plane in which the first optical axis and the second optical axis lie, the second optical axis extending in the second section, wherein the first section is positioned on the opposite side of the second reference plane to that in which the second optical axis extends. As viewed along the first optical axis, the first actuator and the second actuator are positioned in the first section while the rotational axis of the guide portion is positioned in the second section. A first plane which is parallel to the first optical axis and extends in the first direction of the driving force of the first actuator while passing through a center of the first actuator, and a second plane which is parallel to the first optical axis and extends in the second direction of the driving force of the second actuator while passing through a center of the second actuator, intersect each other at a predetermined point of intersection, as viewed along the first optical axis, wherein the point of intersection is located at a different position from that of the first optical axis. A distance from the rotational axis of the guide portion to the point of intersection is greater than a distance from the rotational axis of the guide portion to the first optical axis, as viewed along the first optical axis.

It is desirable for a distance from the point of intersection to the center of gravity of the movable frame to be smaller than a distance from the point of intersection to the first optical axis.

It is desirable for the point of intersection and the center of gravity of the movable frame to lie on the first reference plane.

The relative position between the point of intersection between the first plane and the second plane and the center of gravity of the movable frame in the first reference plane can be freely set so long as the above-stated distance conditions are satisfied. As an example, it is advisable for the point of intersection to be located closer to the first optical axis than the center of gravity of the movable frame in the first reference plane.

It is desirable for the first actuator to include a first voice coil motor which includes a first coil and a first permanent magnet, which are mounted to one and the other of the base member and the movable frame, respectively, the first voice coil motor generating a driving force in a direction orthogonal to a magnetic pole boundary line of the first magnet upon the first coil being energized, and for the second actuator to include a second voice coil motor which includes a second coil and a second permanent magnet, which are mounted to one and the other of the base member and the movable frame, respectively, the second voice coil motor generating a driving force in a direction orthogonal to a magnetic pole boundary line of the second permanent magnet upon the second coil being energized.

According to the present invention, the front lens element of the front lens group, which is positioned in front of the reflector element of the front lens group, is moved in directions orthogonal to an optical axis (the first optical axis) to counteract image shake, which makes it possible to achieve miniaturization of the imaging apparatus in an efficient manner, even though an anti-shake system is incorporated, especially with respect to a reduction in thickness of the imaging apparatus in the forward/rearward direction along the first optical axis that passes through the front lens element. In addition, on the premise of the anti-shake system, having a configuration which drives the front lens element to reduce image shake, being equipped with the guide portion (which guides the movable frame relative to the base member (which holds a reflector element) so as to allow the movable frame to move back and forth in a predetermined linear direction and rotate about a predetermined rotational axis) and the first and second actuators (which provide the movable frame with a driving force in a first direction and a driving force in a second direction, respectively, wherein the first direction and the second direction intersect each other in a plane orthogonal to the first optical axis), the imaging apparatus is configured so that movement of the movable frame is detected with reference to a portion which is great in turning radius about the rotational axis by setting the distance from the point of intersection between the first plane and the second plane, each of which passes through the center of the associated actuator and extends in the direction of the driving force of the associated actuator, to the rotational axis of the guide portion to be greater than the distance from the first optical axis to the rotational axis of the guide portion, which reduces the load on the first and second actuators when the movable frame is rotated about the rotational axis, so that the anti-shake system can perform an anti-shake operation which is superior in driving efficiency.

The present disclosure relates to subject matter contained in Japanese Patent Application No. 2013-216614 (filed on Oct. 17, 2013) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
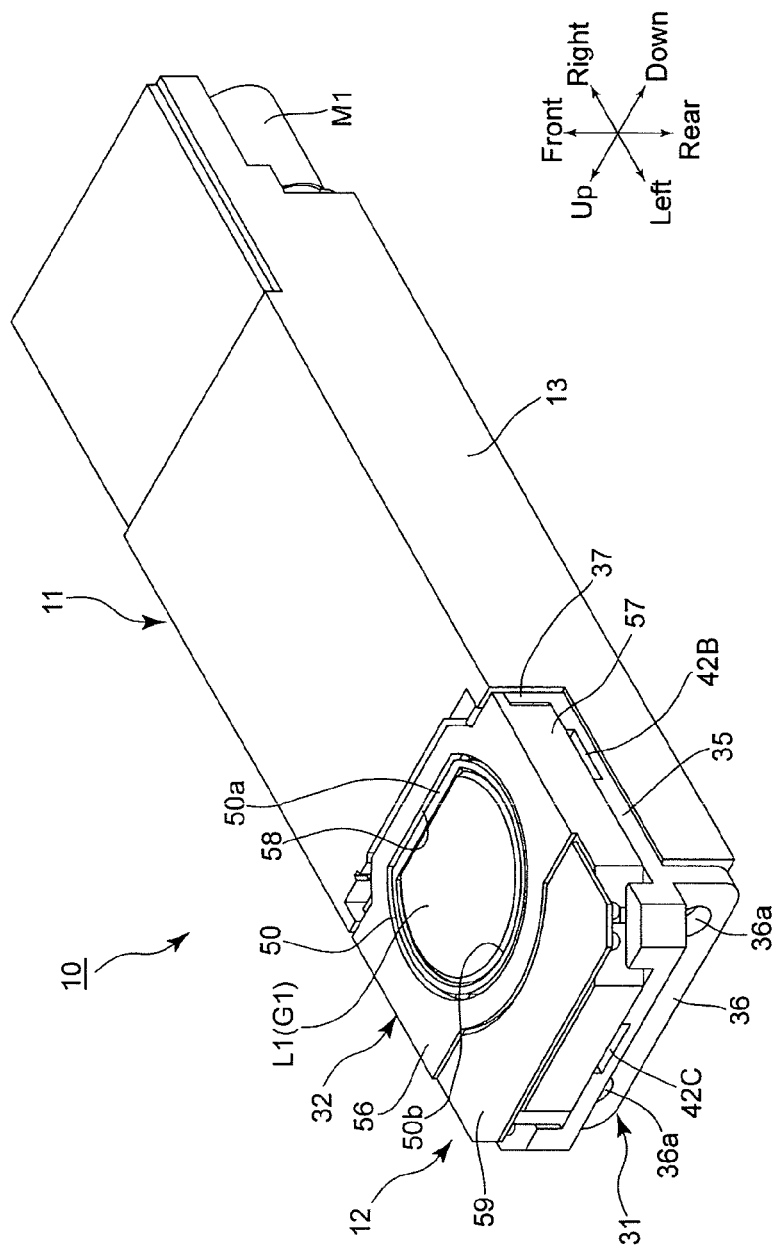
FIG. 1 is a perspective view of an embodiment of an imaging unit according to the present invention.

An embodiment of an imaging unit (imaging apparatus) 10 according to the present invention will be discussed below with reference to FIGS. 1 through 15. In the following descriptions, forward and rearward directions, leftward and rightward directions, and upward and downward directions are determined with reference to the directions of the double-headed arrows shown in the drawings. The object side corresponds to the front side. As shown by the outward appearance of the imaging unit 10 in FIG. 1, the imaging unit 10 has a laterally elongated shape which is slim in the forward/rearward direction and long in the leftward/rightward direction.

Figure 2:
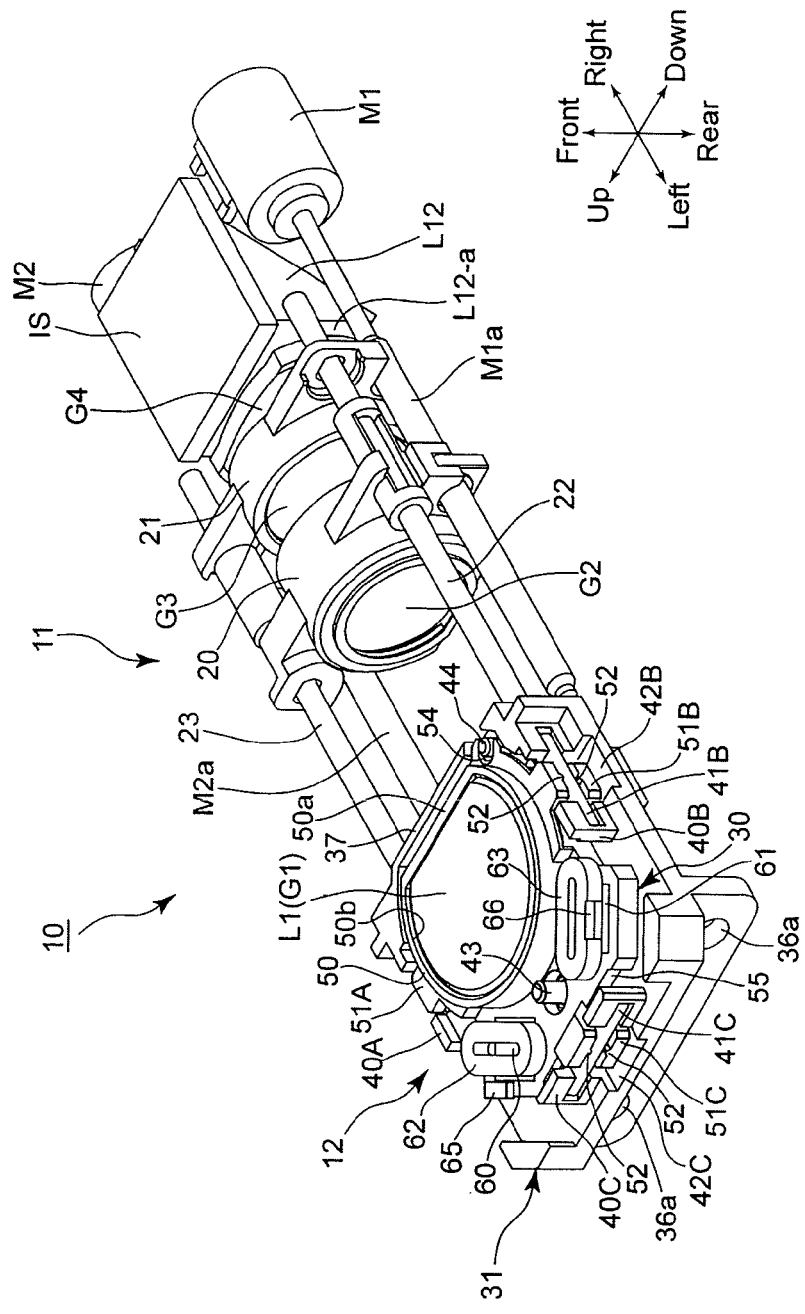
FIG. 2 is a perspective view of the imaging unit with the housing removed, illustrating the internal structure of the imaging unit.
Figure 3:
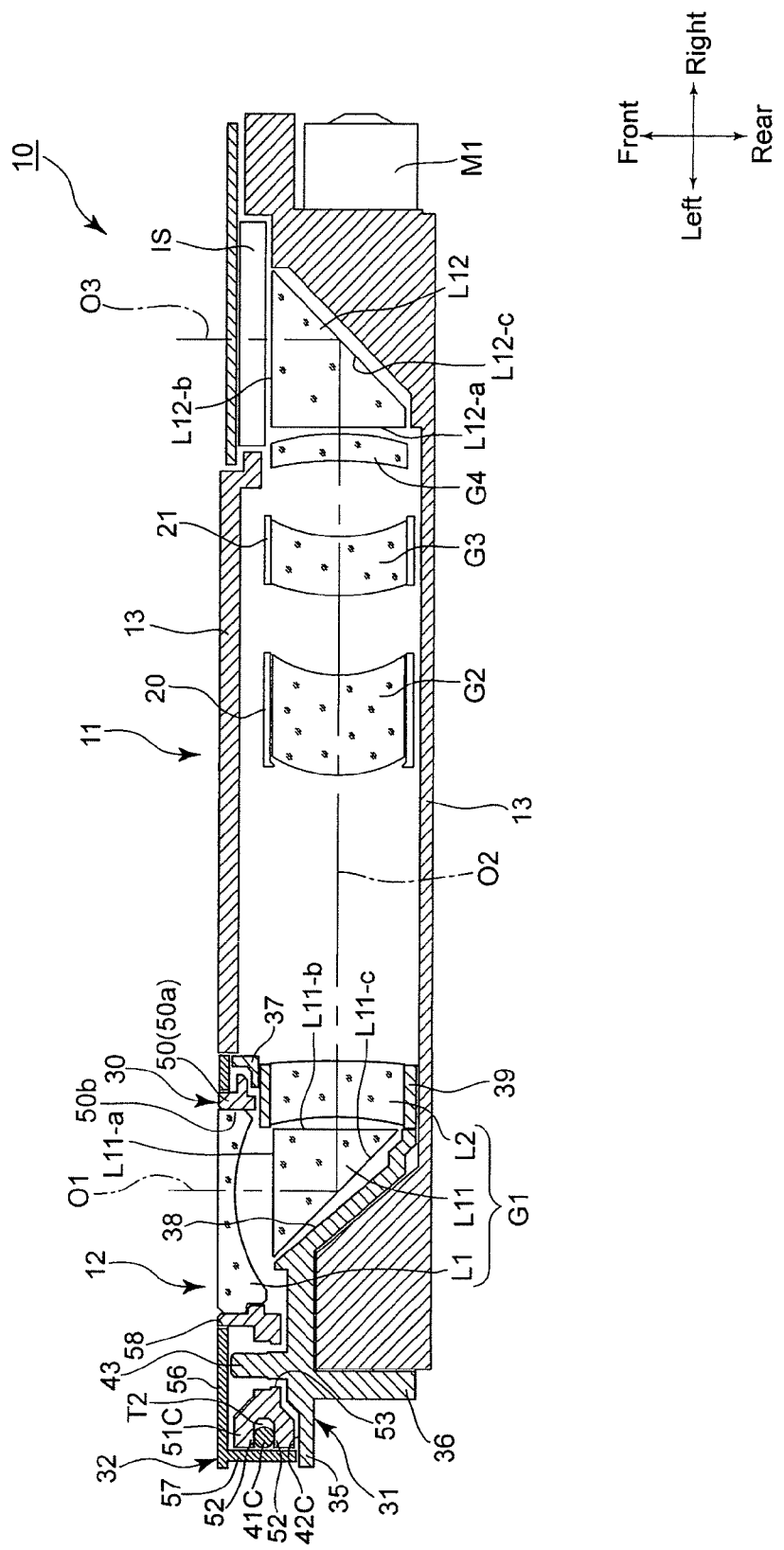
FIG. 3 is a transverse sectional view of the imaging unit.
Figure 9:
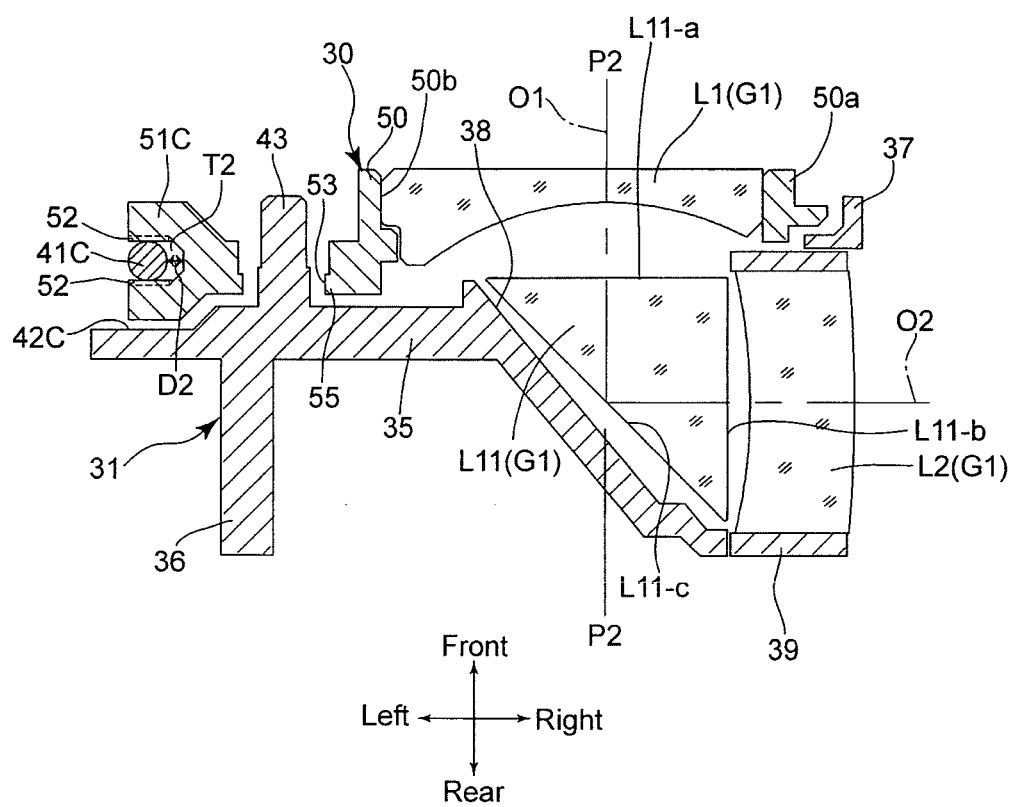
FIG. 9 is a sectional view taken along the line IX-IX shown in FIG. 7, illustrating the first lens-group unit.

As shown in FIGS. 2 and 3, an imaging optical system of the imaging unit 10 is provided with a first lens group (front lens group) G1, a second lens group (rear lens group) G2, a third lens group (rear lens group) G3 and a fourth lens group (rear lens group) G4. The first lens group G1 is provided with a first prism (reflector element) L11 and the imaging unit 10 is provided with a second prism L12 on the right-hand side (image plane side) of the fourth lens group G4. The imaging optical system of the imaging unit 10 is configured as a bending optical system which reflects (bends) light rays at substantially right angles at each of the first prism L11 and the second prism L12. As shown in FIGS. 3 and 9, the first lens group G1 is configured of a first lens element (front lens element) L1, the first prism L11 and a second lens element L2. The first lens element L1 is positioned in front of (on the object side of) an incident surface L11-a of the first prism L11, while the second lens element L2 is positioned on the right-hand side (image plane side) of an exit surface L11-b of the first prism L11. Each of the second lens group G2, the third lens group G3 and the fourth lens group G4 is a lens group including no reflector element such as a prism.

As shown in FIG. 3, light rays emanated from the photographic object and incident on the first lens element L1 along a first optical axis O1 extending in the rearward direction from the front of the imaging unit 10 enter the first prism L11 through the incident surface L11-a and are reflected by a reflecting surface L11-c of the first prism L11 in a direction along a second optical axis O2 (extending in the rightward direction) to exit from the exit surface L11-b of the first prism L11. Subsequently, the light rays exiting from the exit surface L11-b pass through the second lens element L2 of the first lens group G1 and the second through fourth lens groups G2, G3 and G4, which lie on the second optical axis O2, and are incident on the second prism L12 through an incident surface L12-a thereof. Subsequently, the light rays which are passed through the incident surface L12-a are reflected by a reflecting surface L12-c of the second prism L12 in a direction along a third optical axis O3 (extending in the forward direction) and are incident on the imaging surface of an image sensor IS to form an object image thereon. The first optical axis O1 and the third optical axis O3 are substantially parallel to each other and lie, together with the second optical axis O2, on a common plane. This (imaginary) common plane defines a reference plane (first reference plane) P1 (see FIGS. 7, 8, 12 and 13) in which the first optical axis O1, the second optical axis O2 and the third optical axis O3 lie, and an imaginary plane which is orthogonal to the first reference plane P1 and includes the first optical axis O1 is represented by a reference plane (second reference plane) P2 (see FIGS. 7, 9, 12 and 13). The imaging unit 10 has a shape elongated in a direction along the second optical axis O2, and the first lens element L1 is positioned in the vicinity of an end (the left end) of the imaging unit 10 in the lengthwise direction thereof.

As shown in FIGS. 1 through 3, the imaging unit 10 is provided with a body module 11 which holds the second lens group G2, the third lens group G3, the fourth lens group G4, the second prism L12 and the imaging sensor IS, and a first lens-group unit 12 which holds the first lens group G1. The body module 11 is provided with a box-shaped housing 13 which is elongated in the leftward/rightward direction and is small in thickness (slim) in the forward/rearward direction. The first lens-group unit 12 is fixed to one end (the left end) of the housing 13 in the lengthwise direction thereof, and the fourth lens group G4, the second prism L12 and the imaging sensor IS are fixedly held at the other end (the right end) of the housing 13 in the lengthwise direction thereof.

As shown in FIG. 2, the second lens group G2 and the third lens group G3 are held by a second lens group frame 20 and a third lens group frame 21, respectively, which are supported to be movable along the second optical axis O2 by a pair of rods 22 and 23 provided in the housing 13. The imaging unit 10 is provided with a first motor M1 and a second motor M2 that are supported by the housing 13. When the first motor M1 is driven to rotate a screw shaft M1a thereof which projects from the body of the first motor M1, this rotation is transmitted to the second lens group frame 20 to move the second lens group frame 20 along the pair of rods 22 and 23. When the second motor M2 is driven to rotate a screw shaft M2a thereof which projects from the body of the second motor M2, this rotation is transmitted to the third lens group frame 21 to move the third lens group frame 21 along the pair of rods 22 and 23. The imaging optical system of the imaging unit 10 is a zoom lens system (variable-focal length lens system), and a zooming operation (power-varying operation) is performed by moving the second lens group G2 and the third lens group G3 along the second optical axis O2. In addition, a focusing operation is performed by moving the third lens group G3 along the second optical axis O2.

The imaging unit 10 is provided with an anti-shake (image shake correction/image-stabilizing/shake reduction) system that reduces image shake on an image plane which is caused by vibrations such as hand shake. This anti-shake system drives the first lens element L1 of the first lens group G1 in a plane orthogonal to the first optical axis O1. The first optical axis O1 in the following descriptions and the drawings of the present embodiment of the imaging apparatus denotes the position of the first optical axis O1 in a state where the first lens element L1 is positioned at the center of the driving range thereof by the anti-shake system (i.e., at an initial optical-design position of the first lens element L1 when no image shake correction operation is performed). This state will be hereinafter referred to as the anti-shake initial state.

Figure 4:
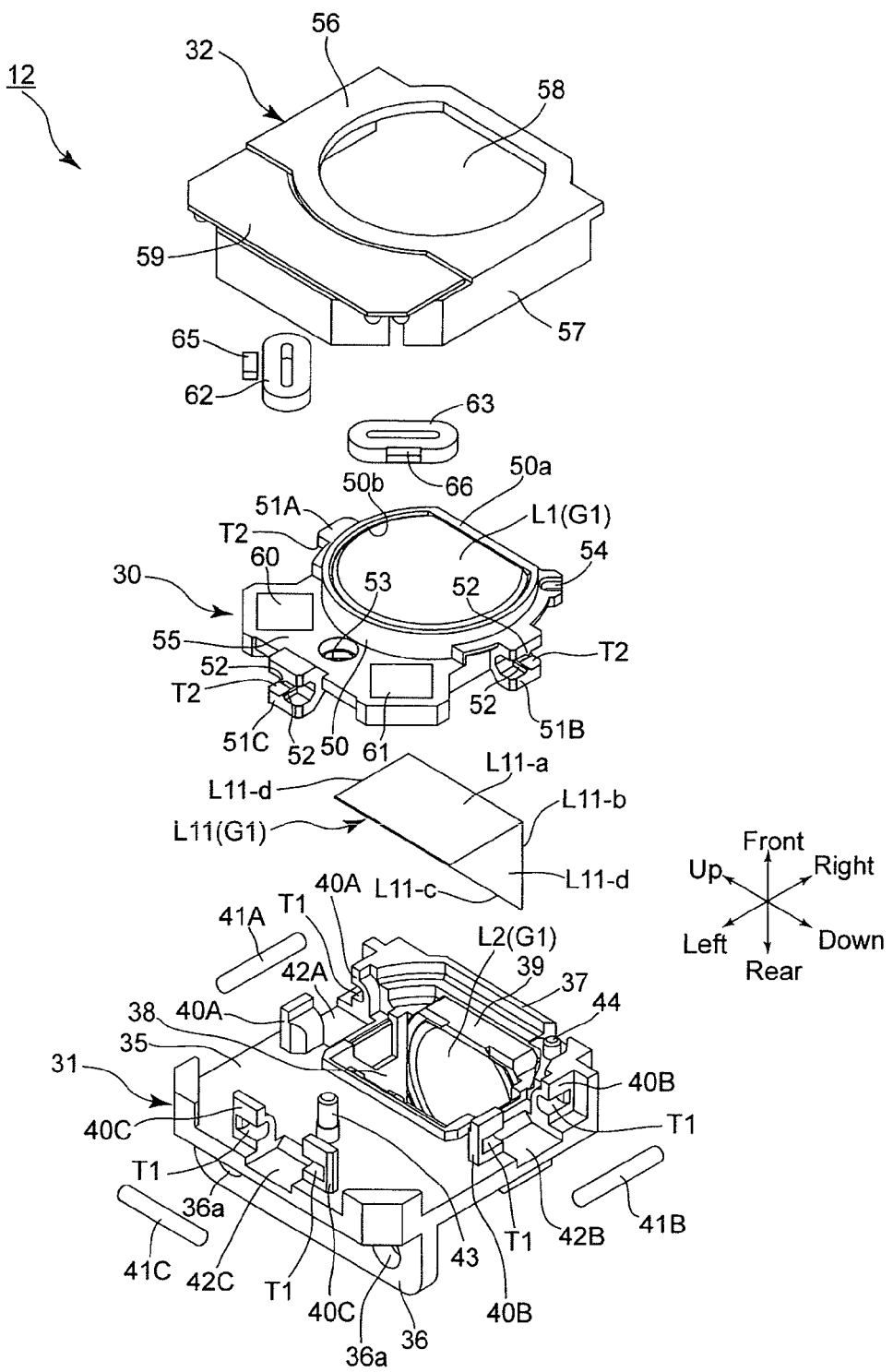
FIG. 4 is an exploded perspective view of a first lens-group unit of the imaging unit that constitutes part of the imaging unit.
Figure 5:
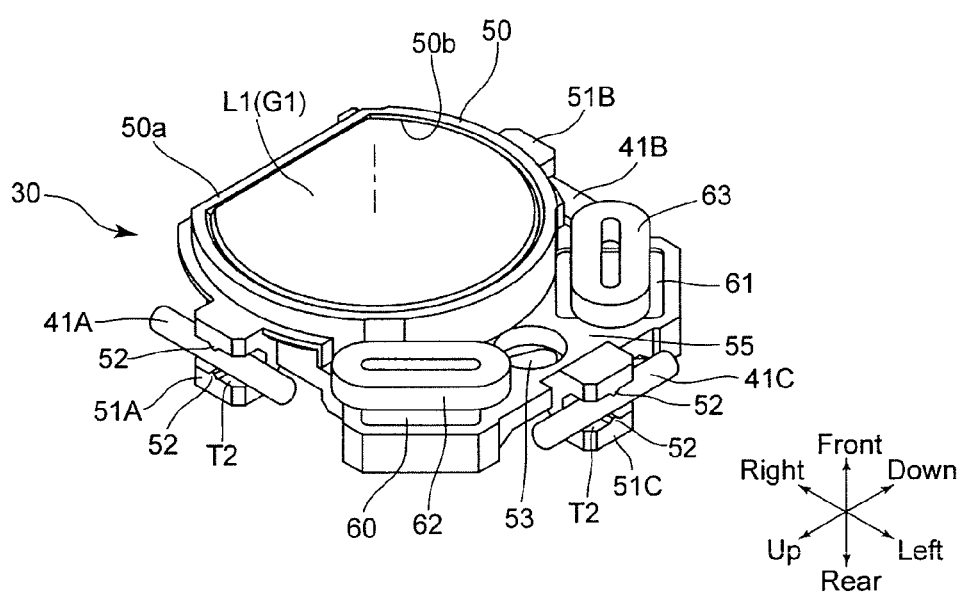
FIG. 5 is a perspective view of a first lens frame, guide shafts and coils that constitute elements of the first lens-group unit, showing the positional relationship therebetween.
Figure 6:
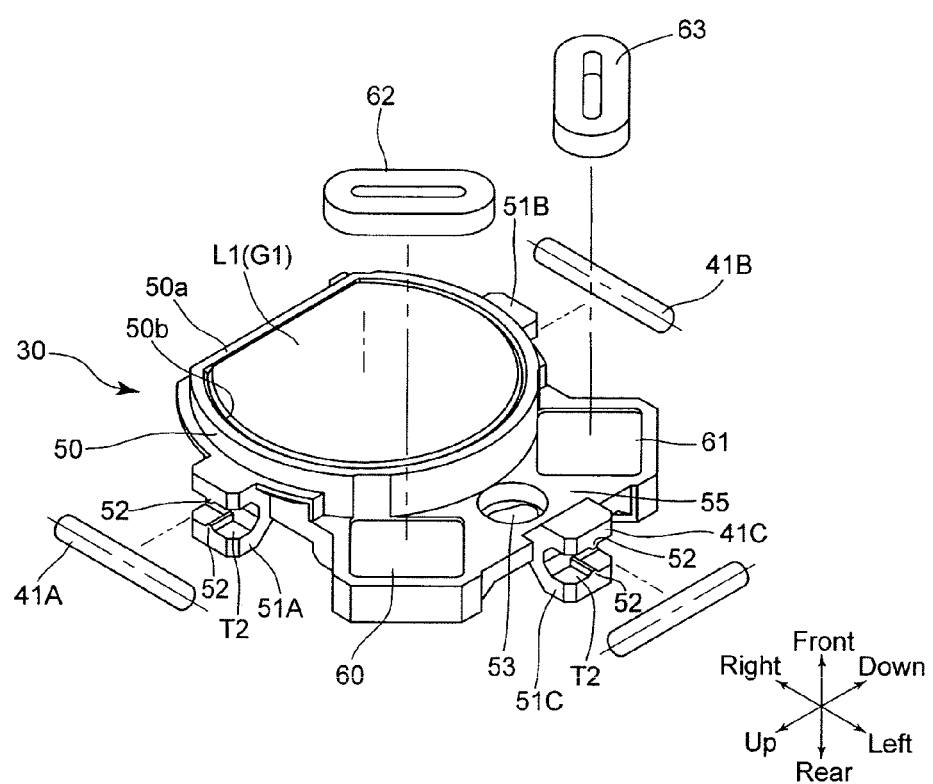
FIG. 6 is an exploded perspective view of the first lens frame, the guide shafts and the coils shown in FIG. 5.
Figure 7:
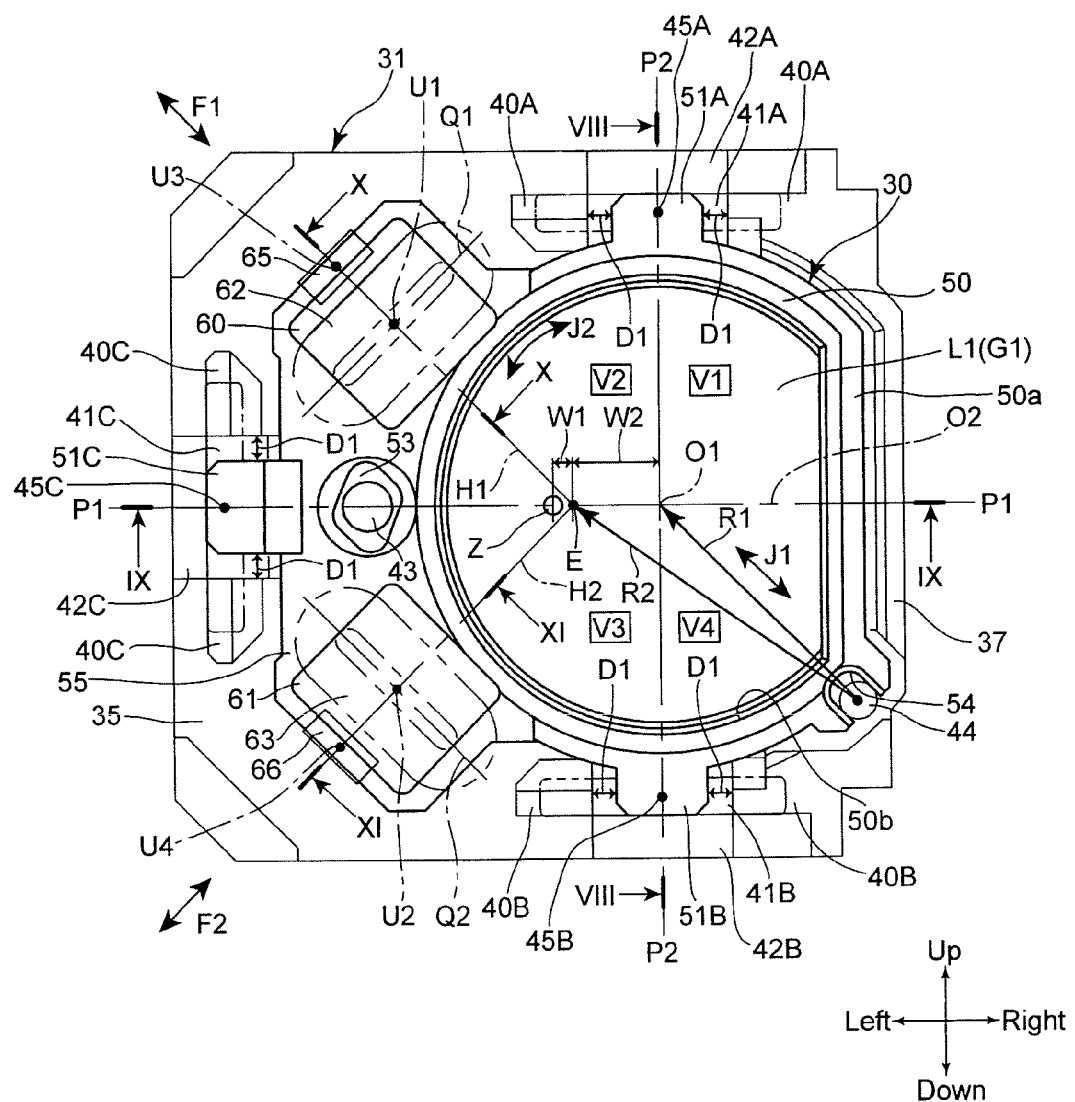
FIG. 7 is a front elevational view of the imaging unit with a covering member removed.
Figure 8:
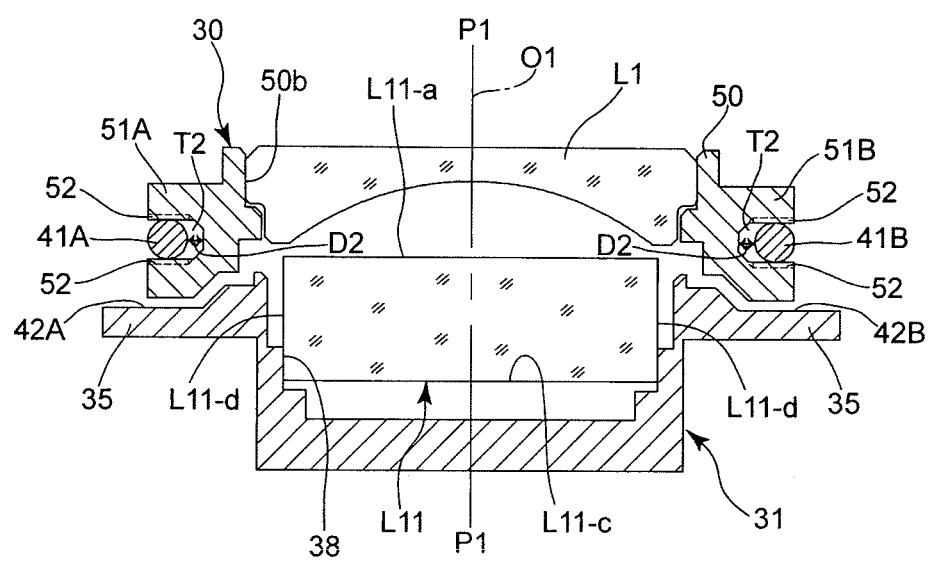
FIG. 8 is a sectional view taken along the line VIII-VIII shown in FIG. 7, illustrating the first lens-group unit.
Figure 8:
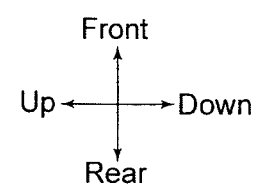
Figure 14:
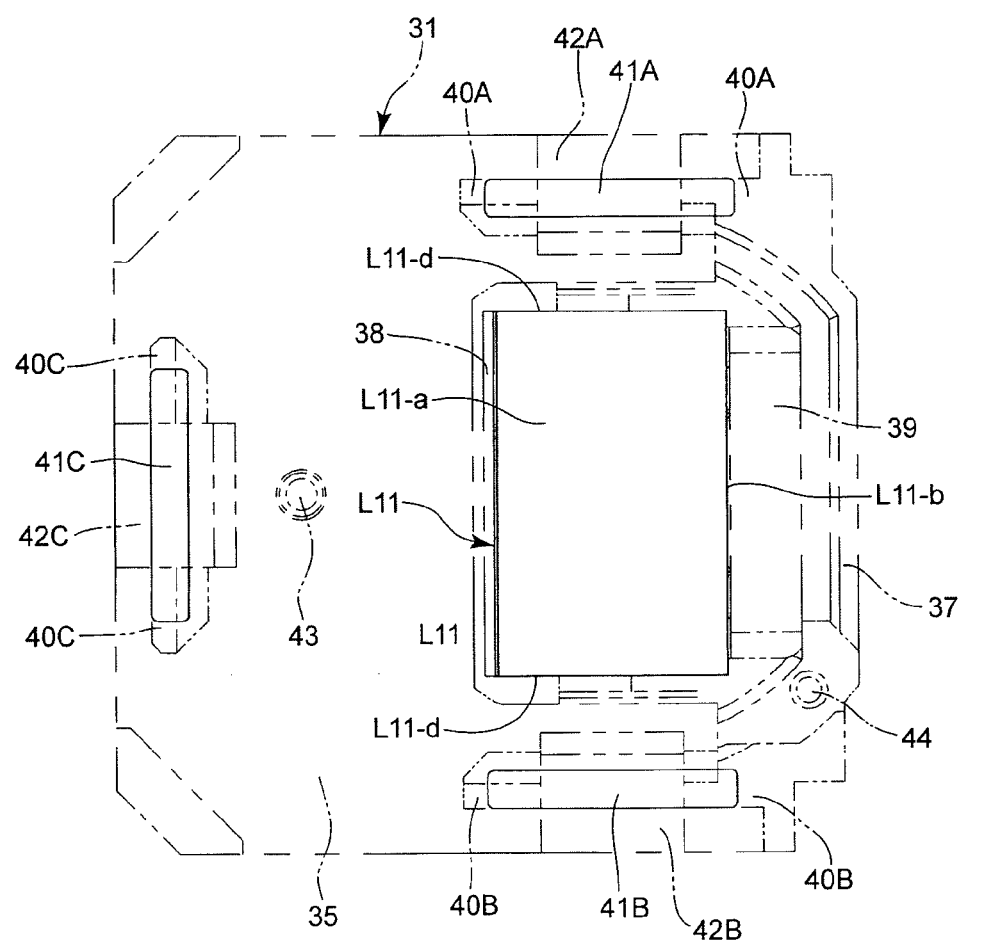
FIG. 14 is a front elevational view of a base member, and the guide shafts and a first prism that are supported on the base member, viewed from the object side.

As shown in FIG. 4, the first lens-group unit 12 is provided with a first lens frame (movable frame) 30 which holds the first lens element L1, a base member 31 which holds the first prism L11 and the second lens element L2, and a cover member 32 which covers the first lens frame 30 and the base member 31 from front. The base member 31 is substantially rectangular in shape as viewed from front as shown in FIGS. 7 and 14 and is provided with a base plate 35, a rear flange 36 and an exit-side flange 37. As shown in FIGS. 4, 8 and 9, the base plate 35 lies in a plane substantially orthogonal to the first optical axis O1, the rear flange 36 projects rearward from the base plate 35, and the exit-side flange 37 is positioned at the right end of the base plate 35. The support position of the first lens-group unit 12 on the body module 11 is determined by making the rear flange 36 and the exit-side flange 37 abut against the housing 13 and by engaging ends of the pair of rods 22 and 23 in holes formed in the exit-side flange 37 (see FIGS. 1 and 3). The first lens-group unit 12 is fixed to the body module 11 by screwing set screws which are inserted into holes 36a (see FIGS. 1, 2 and 4) formed through the rear flange 36 of the base member 31, into screw holes (not shown) formed in the housing 13. The aforementioned set screws are not shown in the drawings.

As shown in FIGS. 3, 4, 8, 9 and 14, the base member 31 is provided with a prism mounting recess 38. The front side of the prism mounting recess 38 is open and exposed at the top of the base plate 35, while the right side of the prism mounting recess 38 is open and exposed toward the exit-side flange 37. The first prism L11 is fit-engaged into the prism mounting recess 38 and fixed thereto. The first prism L11 is provided with the incident surface L11-a, the exit surface L11-b, the reflecting surface L11-c and a pair of side surfaces L11-d. The incident surface L11-a is positioned on the first optical axis O1 and faces forward, the exit surface L11-b is positioned on the second optical axis O2 and faces rightward, the reflecting surface L11-c is positioned at an angle of substantially 45 degrees with respect to the incident surface L11-a and the exit surface L11-b, and the pair of side surfaces L11-d are substantially orthogonal to both the incident surface L11-a and the exit surface L11-b. The exit surface L11-b is substantially parallel to the second reference plane P2, and the pair of side surfaces L11-d are substantially parallel to the first reference plane P1. The base member 31 is further provided with a lens holding portion 39 which extends through the exit-side flange 37 in the rightward direction from the prism mounting recess 38, and the second lens element L2 is fit-engaged into the lens holding portion 39 to be held thereby.

Figure 12:
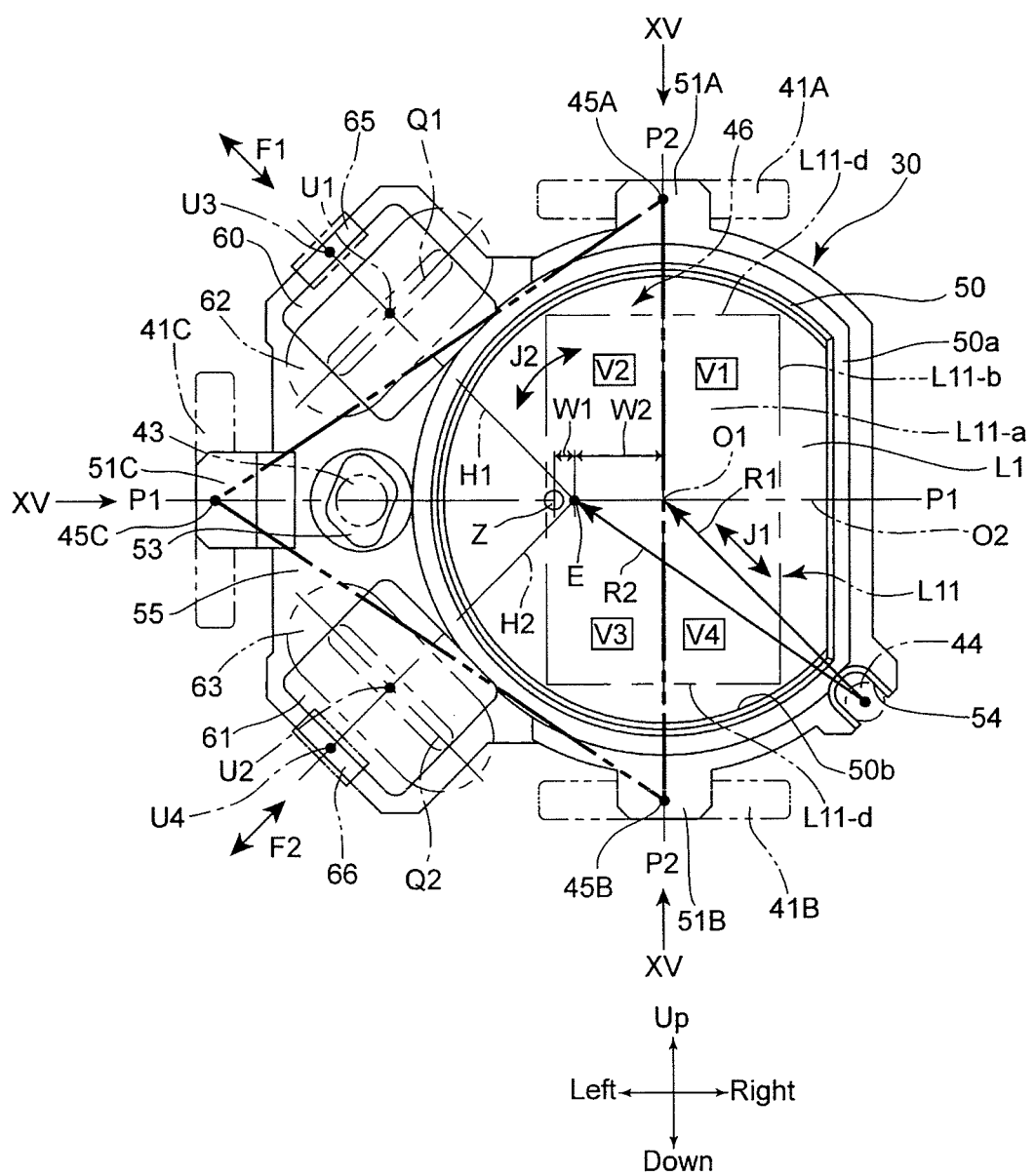
FIG. 12 is a front elevational view of a first lens frame that holds a first lens element of the imaging optical system of the imaging unit, viewed from the object side.

As shown in FIGS. 4, 12 and 14, the incident surface L11-a of the first prism L11 is in the shape of a (non-square) rectangle which is defined by two pairs of sides (two long sides and two short sides). The first prism L11 is positioned in the prism mounting recess 38 so that the long sides (a pair of opposite sides) of the incident surface L11-a extend upward and downward and that the short sides (the other pair of opposite sides) of the incident surface L11-a extend leftward and rightward. In the following descriptions, the long side of the incident surface L11-a that adjoins the exit surface L11-b (and which constitutes the boundary between the incident surface L11-a and the exit surface L11-b) is referred to as the exit long-side of the incident surface L11-a, and the long side of the incident surface L11-a that is on the opposite side of the exit long-side and far from the exit surface L11-b (and which constitutes the boundary between the incident surface L11-a and the reflecting surface L11-c) is referred to as the end long-side of the incident surface L11-a. The pair of short sides of the incident surface L11-a, which connect the exit long-side and the end long-side of the incident surface L11-a, constitute the boundaries between the incident surface L11-a and the pair of side surfaces L11-d.

The base member 31 is provided on the front of the base plate 35 with three guide support portions 40A, 40B and 40C. As shown in FIGS. 7 and 14, the guide support portions 40A and 40B are arranged at positions along the pair of side surfaces L11-d (the pair of short sides of the incident surface L11-a) of the first prism L11 and are symmetrical with respect to the first reference plane P1, and the guide support portion 40C is positioned between the end long-side of the incident surface L11-a and the left end of the base member 31. In other words, the guide support portions 40A, 40B and 40C are formed in a U-shaped area along the three sides of the incident surface L11-a except for the exit long-side thereof. As shown in FIG. 4, each of the guide support portions 40A, 40B and 40C is U-shaped in cross section and has an elongated open groove T1 that is open toward the peripheral edge of the base member 31. The elongated open grooves T1 of the guide support portions 40A and 40B are elongated grooves which are elongated in a direction substantially parallel to the short sides of the incident surface L11-a of the first prism L11, and the elongated open groove T1 of the guide support portion 40C is an elongated groove which is elongated in a direction substantially parallel to the long sides of the incident surface L11-a of the first prism L11.

A guide shaft 41A, a guide shaft 41B and a guide shaft 41C support the first lens frame 30 in a manner to allow the first lens frame 30 to move relative to the base member 31 and are inserted into and supported by the elongated open grooves T1 of the guide support portions 40A, 40B and 40C, respectively. The guide shafts 41A, 41B and 41C are cylindrical columnar members which have a uniform cross section throughout the lengthwise direction and are made of metal, synthetic resin or the like. The elongated open groove T1 of the guide support portion 40A is open on the upper side thereof, and the guide shaft 41A is inserted into the elongated open groove T1 of the guide support portion 40A in a direction toward the first optical axis O1 from this upper-side opening that faces upward. The elongated open groove T1 of the guide support portion 40B is open on the lower side thereof, and the guide shaft 41B is inserted into the elongated open groove T1 of the guide support portion 40B in a direction toward the first optical axis O1 from this lower-side opening that faces downward. The elongated open groove T1 of the guide support portion 40C is open on the left side thereof, and the guide shaft 41C is inserted into the elongated open groove T1 of the guide support portion 40C in a direction toward the first optical axis O1 from this left-side opening that faces leftward. Each guide shaft 41A, 41B and 41C can be inserted into the associated elongated open groove T1 along a plane orthogonal to the first optical axis O1, and the axes of the guide shafts 41A, 41B and 41C lie in a plane orthogonal to the first optical axis O1 with each guide shaft 41A, 41B and 41C inserted into the associated elongated open groove T1. More specifically, as shown in FIGS. 7, 12 and 14, the axes of the guide shafts 41A and the 41B are substantially parallel to the short sides (the pair of side surfaces L11-d) of the incident surface L11-a of the first prism L11 and the first reference plane P1, and the axis of the guide shaft 41A and the axis of the guide shaft 41B are substantially equi-distant from the first reference plane P1. In addition, the axis of the guide shaft 41C is substantially parallel to the long sides of the incident surface L11-a of the first prism L11 and the second reference plane P2. Furthermore, as shown in FIGS. 7 and 12, the center points of the guide shafts 41A and 41B with respect to the axial direction thereof lie on the second reference plane P2, and the center point of the guide shaft 41C with respect to the axial direction thereof lies on the first reference plane P1. Cutouts (recesses) 42A, 42B and 42C are formed in central portions of the guide support portions 40A, 40B and 40C, each of which has a shape so as not to hold the associated guide shaft 41A, 41B or 41C. The cutouts 42A and 42B are positioned on the second reference plane P2, and the cutout 42C is positioned on the first reference plane P1.

The base member 31 is provided on the front of the base plate 35 with a movement limit projection 43 and a swing pivot (rotational axis) 44, each of which projects forward. As shown in FIGS. 4 and 14, the movement limit projection 43, together with a movement limit hole 53 which will be discussed in detail later, constitutes a limit portion which defines the range of movement of the first lens frame 30 relative to the base member 31, and is a cylindrical columnar projection which is formed between the prism mounting recess 38 (the end long-side of the incident surface L11-a of the prism L11) and the cutout 42C. The swing pivot 44, together with a pivot support groove 54 which will be discussed in detail later, constitutes a guide portion for determining the moving direction of the first lens frame 30 relative to the base member 31 and is a cylindrical columnar projection which is formed near the boundary between the guide support portion 40B and the exit-side flange 37 (in the vicinity of the corner between the lower short side of the incident surface L11-a and the exit long-side of the incident surface L11-a) in the vicinity of the prism mounting recess 38.

Figure 13:
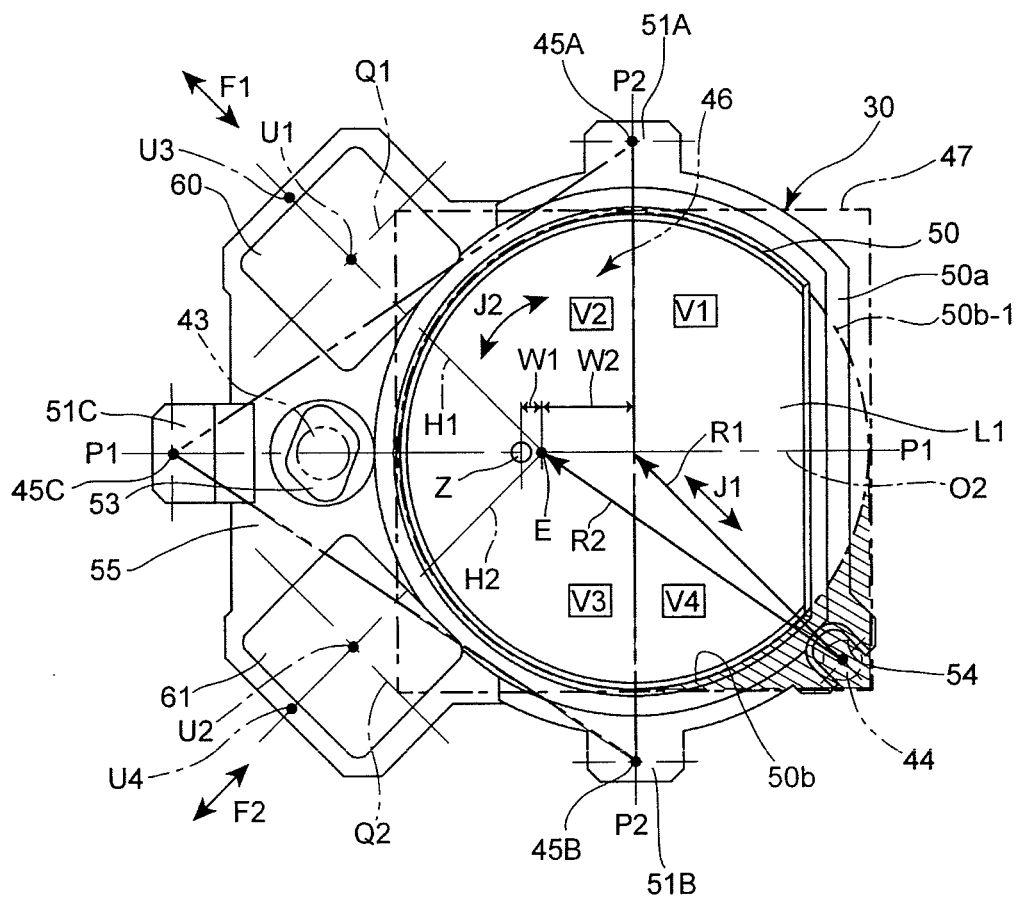
FIG. 13 is a front elevational view of the first lens frame, viewed from the object side.

In the anti-shake system of the imaging unit 10, the first lens frame 30 is supported by the base member 31 to be movable in a plane orthogonal to the first optical axis O1 via the three guide shafts 41A, 41B and 41C. As shown in FIGS. 4 through 7, 12 and 13, the first lens frame 30 is provided with a cylindrical lens holding portion 50 having a lens holding opening 50b, into which the first lens element L1 is fixedly fitted, and a flange 55 which projects in a direction (leftward direction) opposite to the direction of extension of the second optical axis O2. The first lens frame 30 is further provided around the lens holding portion 50 and the flange 55 with three slidable support portions 51A, 51B and 51C. As viewed from the front as shown in FIGS. 7, 12 and 13, the first lens element L1 has a D-cut shape that is formed (defined) with a portion of the outer edge (circular edge with its center on the first optical axis O1) of the first lens element L1 cut out on the right side thereof (the side from which the second optical axis O2 extends rightward from the reflecting surface L11-c of the first prism L11). A part of the right side of the lens holding portion 50 is formed into a linear-cut portion 50a substantially parallel to the second reference plane P2 to correspond in outside shape to the first lens element L1. A one-dot chain line (imaginary line) designated by the reference character 50b-1 shown in FIG. 13 shows the outline of an imaginary lens holding opening of the cylindrical lens holding portion 50 in the case where the cylindrical lens holding portion 50 were not to be provided with the linear-cut portion 50a, thus having a perfect circular cylindrical shape. The three slidable support portions 51A, 51B and 51C are formed on the first lens frame 30 along three sides thereof except the side on which the D-cut portion (linear-cut portion 50a) is formed.

More specifically, the slidable support portions 51A and 51B are formed on the periphery of the lens holding portion 50 to be symmetrical with respect to the first reference plane P1, and the slidable support portion 51C is formed at the left end of the flange 55. In the state shown in FIGS. 7 through 9, in which the first lens frame 30 is supported by the base member 31, the slidable support portion 51A is positioned above the cutout 42A, the slidable support portion 51B is positioned above the cutout 42B and the slidable support portion 51C is positioned above the cutout 42C. The cutouts 42A, 42B and 42C serve as clearance recesses which prevent the guide support portions 40A, 40B and 40C from interfering with the slidable support portions 51A, 51B and 51C, respectively, when the first lens frame 30 moves relative to the base member 31 to perform an anti-shake operation.

As shown in FIGS. 4 through 6, 8 and 9, each of the three slidable support portions 51A, 51B and 51C is U-shaped in cross section and has an elongated open groove T2 that is open toward the peripheral edge of the first lens frame 30. The elongated open grooves T2 of the slidable support portions 51A and 51B are elongated in a direction substantially parallel to the short sides of the incident surface L11-a of the first prism L11, and the elongated open groove T2 of the slidable support portion 51C is elongated in a direction substantially parallel to the long sides of the incident surface L11-a of the first prism L11. The guide shaft 41A is inserted into the elongated open groove T2 of the slidable support portion 51A from the upper-side opening of this elongated open groove that faces upward, the guide shaft 41B is inserted into the elongated open groove T2 of the slidable support portion 51B from the lower-side opening of this elongated open groove that faces downward, and the guide shaft 41C is inserted into the elongated open groove T2 of the slidable support portion 51C from the left-side opening of this elongated open groove that faces leftward. In an assembly process, it is advisable that the base member 31 and the first lens frame 30 be combined together and thereafter each guide shaft 41A, 41B and 41C be inserted into the associated elongated open groove T1 and the associated elongated open groove T2. When the first lens frame 30 is mounted on the base member 31 with the slidable support portions 51A, 51B and 51C respectively aligned with the cutouts 42A, 42B and 42C, the elongated open grooves T2 of the slidable support portions 51A, 51B and 51C are positioned relative to the elongated open grooves T1 of the guide support portions 40A, 40B and 40C such that the elongated open grooves T1 are communicatively connected with, and coaxial with, the elongated open grooves T2, respectively (each elongated open groove T2 is positioned at the midpoint of the associated elongated open groove T1 in the elongated direction thereof). In this state, the guide shaft 41A is inserted into the elongated open groove T1 of the guide support portion 40A and the elongated open groove T2 of the slidable support portion 51A in a direction toward the first optical axis O1 from the upper-side openings of these elongated open grooves T1 and T2 that face upward. Likewise, the guide shaft 41B is inserted into the elongated open groove T1 of the guide support portion 40B and the elongated open groove T2 of the slidable support portion 51B in a direction toward the first optical axis O1 from the lower-side openings of these elongated open grooves T1 and T2 that face downward, and the guide shaft 41C is inserted into the elongated open groove T1 of the guide support portion 40C and the elongated open groove T2 of the slidable support portion 51C in a direction toward the first optical axis O1 from the left-side openings of these elongated open grooves T1 and T2 that face leftward. Each guide shaft 41A, 41B and 41C inserted into the associated elongated open groove T1 is fixed, at both ends thereof, inside the associated elongated open groove T1 by an adhesive, press-fitting, etc., and held so as not to come off the associated elongated open groove T1 by an outer surrounding wall 57 of the cover member 32.

Figure 15:
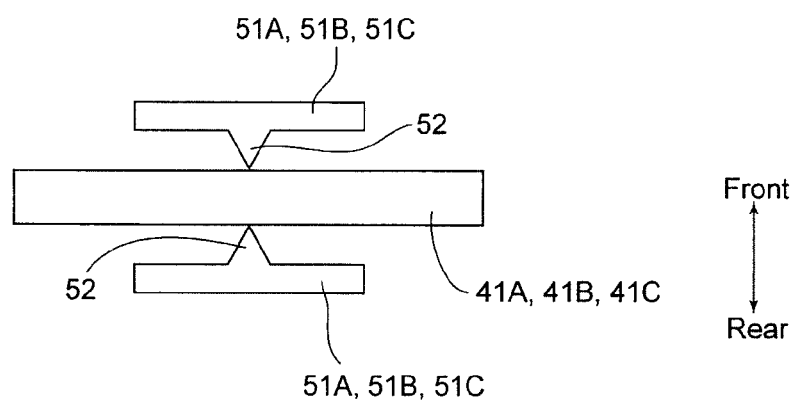
FIG. 15 is a view of a guide shaft and a pair of projections associated therewith which are formed on a slidable support portion of the first lens frame, showing the abutting relationship therebetween, viewed in the direction of an associated arrow XV of FIG. 12.

As shown in FIGS. 4 through 6, 8 and 9, each slidable support portion 51A, 51B and 51C is provided in the elongated open groove T2 thereof with a pair of projections 52 which face each other in a direction parallel to the first optical axis O1, and the pair of projections 52 of each slidable support portion 51A, 51B and 51C holds the associated guide shaft 41A, 41B or 41C therebetween from both sides thereof in a direction parallel to the first optical axis O1. Each pair of projections 52 project in opposite directions toward each other so as to partially narrow the width of the associated elongated open groove T2 in a direction parallel to the first optical axis O1 to hold the associated guide shaft 41A, 41B or 41C with substantially no clearance (specifically, with the presence of a minimum clearance allowing the associated slidable support portion 51A, 51B or 51C to slide on the associated guide shaft 41A, 41B or 41C). This structure prevents the first lens frame 30 from moving relative to the base member 31 in a direction along the first optical axis O1. As shown in FIG. 15, each projection 52 is shaped to taper toward the tip thereof (specifically, each pair of projections 52 are shaped to taper toward each other). On the other hand, the three guide shafts 41A, 41B and 41C are each cylindrical in outer peripheral shape and are in contact with the pairs of projections 52 of the three slidable support portions 51A, 51B and 51C at three support points 45A, 45B and 45C shown in FIGS. 7, 12 and 13, respectively, as viewed from front or rear. At each of the three support points 45A, 45B and 45C, the pair of projections 52 that face each other abut against the associated guide shaft 41A, 41B or 41C, and therefore, the first lens frame 30 is supported at six points: the front three points support points 45A, 45B and 45C and the rear three support points 45A, 45B and 45C. Each projection 52 is slidable on the associated guide shaft 41A, 41B or 41C via the support point 45A, 45B or 45C in a direction along a plane orthogonal to the first optical axis O1. The formation of each projection 52 into a tapered shape reduces the contacting area of each projection 52 with the associated guide shaft 41A, 41B or 41C, which makes it possible to reduce friction between each projection 52 and the associated guide shaft 41A, 41B or 41C when each projection 52 slides on the associated guide shaft 41A, 41B or 41C. The contacting area of each projection 52 with the associated guide shaft 41A, 41B or 41C can be minimized by tapering the end of each projection 52 as shown in FIG. 15; however, from the viewpoint of ease in dimensional control during manufacture, the contact portion of each projection 52 which is in contact with the associated guide shaft 41A, 41B or 41C can be formed as a flat surface (the upper base of a trapezoid) lying in a plane substantially orthogonal to the first optical axis O1. In this case also, it is desirable to reduce the width of the end of each projection 52 as small as possible. FIGS. 7, 12 and 13 show the positions of the support points 45A, 45B and 45C in the anti-shake initial state. When the first lens frame 30 moves relative to the base member 31 to reduce image shake from the anti-shake initial state, the position of each support point 45A, 45B and 45C relative to the first optical axis O1 varies; however, the relative positions between the support points 45A, 45B and 45C remain substantially constant.

Figure 16:
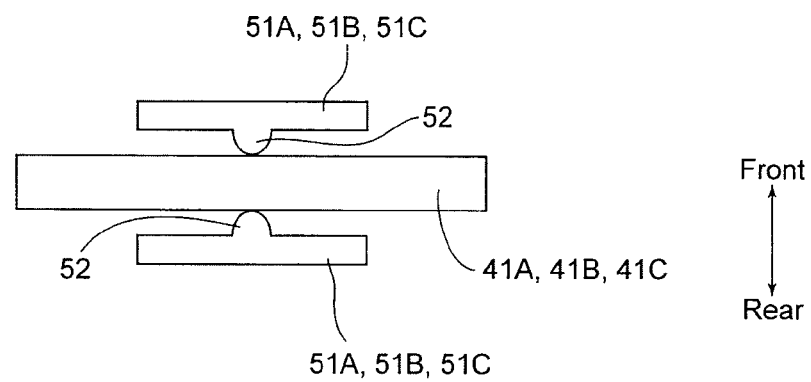
FIG. 16 is a view of a guide shaft and a pair of projections associated therewith which are formed on the slidable support portion of the first lens frame, showing the abutting relationship therebetween, viewed in the direction of an associated arrow XV, wherein the pair of projections are different in shape from those shown in FIG. 15.

It is possible to change the shape of each projection 52 of each slidable support portion 51A, 51B and 51C. For instance, each projection 52 of each slidable support portion 51A, 51B and 51C can take a semi-cylindrical outer surface shape as shown in FIG. 16.

As shown in FIG. 7, a clearance D1 is provided on each opposite side of each slidable support portion 51A, 51B and 51C, in the sliding direction thereof, with respect to the associated (adjacent) guide support portion 40A, 40B or 40C to allow each slidable support portion 51A, 51B and 51C to move in the axial direction of the associated guide shaft 41A, 41B or 41C. In addition, as shown in FIGS. 8 and 9, a clearance D2 is provided in the elongated open groove T2 of each slidable support portion 51A, 51B and 51C between the base of this elongated open groove T2 and the associated guide shaft 41A, 41B or 41C inserted therein to allow each slidable support portion 51A, 51B and 51C to move in the direction of depth of the elongated open groove T2 that is orthogonal to the axis of the associated guide shaft 41A, 41B or 41C. Namely, the slidable support portions 51A, 51B and 51C are supported to be movable along a plane orthogonal to the first optical axis O1 via the guide shafts 41A, 41B and 41C, respectively, that are fixedly supported on the base member 31.

The flange 55 of the first lens frame 30 is provided with the aforementioned movement limit hole 53. The movement limit hole 53 is formed through the flange 55 in the forward/rearward direction, and the movement limit projection 43 of the base member 31 is inserted into the movement limit hole 53. The movement limit hole 53, together with the movement limit projection 43, constitutes the aforementioned limit portion, which defines the range of movement of the first lens frame 30 relative to the base member 31. As shown in FIGS. 7, 12 and 13, the inner wall of the movement limit hole 53 is generally rectangular in shape in a plane substantially orthogonal to the first optical axis O1. The first lens frame 30 can move relative to the base member 31 within a range until the movement limit projection 43 comes into contact with the inner wall of the movement limit hole 53. The aforementioned clearances D1 and D2 that are set in each slidable support portion 51A, 51B and 51C are set to be greater than the moving range of the first lens frame 30 that is allowed by the movement limit hole 53 and the movement limit projection 43, and the moving range of the first lens frame 30 relative to the base member 31 is determined by the movement limit projection 43 and the movement limit hole 53. In the anti-shake initial state, the first lens frame 30 is positioned at the center in the range of movement thereof, which is defined by the movement limit projection 43 and the movement limit hole 53.

The first lens frame 30 is further provided with the aforementioned pivot support groove 54, in which the swing pivot 44 of the base member 31 is engaged. The pivot support groove 54 is an elongated groove which is elongated in a radial direction, centered at the first optical axis O1, and exposed radially outwards, toward the outer periphery of the first lens frame 30. The pivot support groove 54, together with the swing pivot 44, constitutes the aforementioned guide portion, which is for determining the moving direction of the first lens frame 30 relative to the base member 31. As shown in FIGS. 7, 12 and 13, the pivot support groove 54 is engaged with the swing pivot 44 with a clearance allowing the pivot support groove 54 to move relative to the swing pivot 44 in the lengthwise (depthwise) direction of the pivot support groove 54, and the pivot support groove 54 is prevented from moving relative to the swing pivot 44 in a direction orthogonal to the lengthwise direction of the pivot support groove 54. Although the first lens frame 30 is supported by the base member 31 to be movable in a plane orthogonal to the first optical axis O1 due to the sliding engagement of the three guide shafts 41A, 41B and 41C with the slidable support portions 51A, 51B and 51C as mentioned above, the moving direction of the first lens frame 30 in the aforementioned orthogonal plane is defined by the engagement of the swing pivot 44 with the pivot support groove 54. Specifically, the first lens frame 30 is supported by the base member 31 to be allowed to move linearly in the lengthwise direction of the pivot support groove 54 (this linear moving operation is shown by a double-headed arrow J1 shown in FIGS. 7, 12 and 13) and swing (rotate) about the swing pivot 44 (this swinging operation is shown by a double-headed arrow J2 shown in FIGS. 7, 12 and 13).

The movement limit projection 43 and the swing pivot 44 are inserted into the movement limit hole 53 and the pivot support groove 54, respectively, at a stage when the first lens frame 30 is mounted on the base member 31 and before the installation of the guide shafts 41A, 41B and 41C.

As shown in FIG. 4, the cover member 32 is provided with a plate-shaped front wall 56 which is orthogonal to the first optical axis O1 and the outer surrounding wall 57 that projects rearward from the front wall 56. The cover member 32 is fixed onto the base member 31 so that the front wall 56 covers the first lens frame 30 from the front. In this fixed state, the outer surrounding wall 57 is a U-shaped wall that surrounds the three guide support portions 40A, 40B and 40C of the base member 31 from the outer side, and the side openings of the elongated open grooves T1 of the guide support portions 40A, 40B and 40C and the side openings of the elongated open grooves T2 of the slidable support portions 51A, 51B and 51C are all closed by the outer surrounding wall 57 (see FIG. 3). The front wall 56 is provided with a photographic aperture 58, through which the first lens element L1 is exposed forward (toward the object side).

The first lens frame 30 is driven by an electromagnetic actuator. This electromagnetic actuator includes two voice coil motors (VCMs) provided with two permanent magnets 60 and 61 and two coils 62 and 63, respectively. The two permanent magnets 60 and 61 are supported by the first lens frame 30 and the two coils 62 and 63 are supported by the cover member 32. The permanent magnets 60 and 61 are fitted into and held by magnet holding holes formed in the flange 55 of the first lens frame 30 (see FIGS. 10 and 11). Each of the permanent magnets 60 and 61 is in the shape of a rectangular thin plate. The permanent magnets 60 and 61 are arranged symmetrically with respect to the first reference plane P1. More specifically, opposite sides of a magnetic pole boundary line Q1 (see FIGS. 7, 12 and 13) of the permanent magnet 60 are magnetized into north and south poles, respectively, while opposite sides of a magnetic pole boundary line Q2 (see FIGS. 7, 12 and 13) of the permanent magnet 61 are magnetized into north and south poles, respectively. In other words, the magnetic pole boundary line Q1 defines a boundary between north and south poles of the permanent magnet 60, while the magnetic pole boundary line Q2 defines a boundary between north and south poles of the permanent magnet 61. The magnetic pole boundary line Q1 of the permanent magnet 60 and the magnetic pole boundary line Q2 of the permanent magnet 61 are inclined to each other so that the distance therebetween (i.e., the distance from the first reference plane P1) gradually increases in a direction from left to right. The inclination angles of the magnetic pole boundary lines Q1 and Q2 of the permanent magnets 60 and 61 with respect to the first reference plane P1 are set to approximately ±45 degrees, respectively. Namely, the permanent magnets 60 and 61 are arranged so that the magnetic pole boundary lines Q1 and Q2 are substantially orthogonal to each other.

Figure 10:
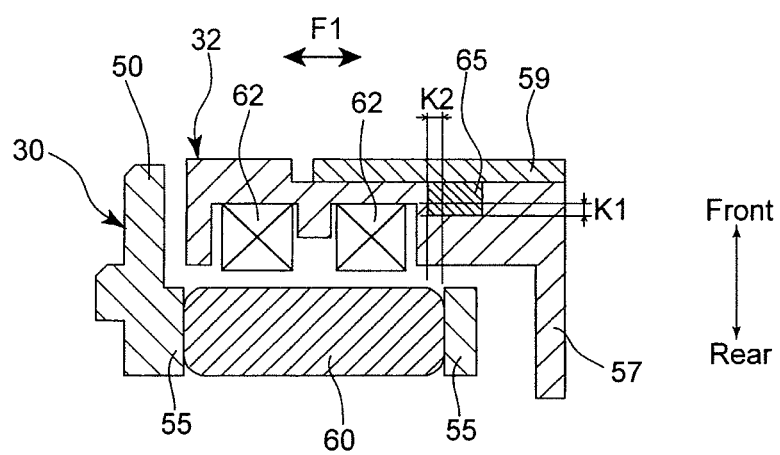
FIG. 10 is a sectional view taken along the line X-X shown in FIG. 7, illustrating a portion of an electromagnetic actuator provided in the first lens-group unit, and the vicinity thereof, with the covering member mounted.
Figure 11:
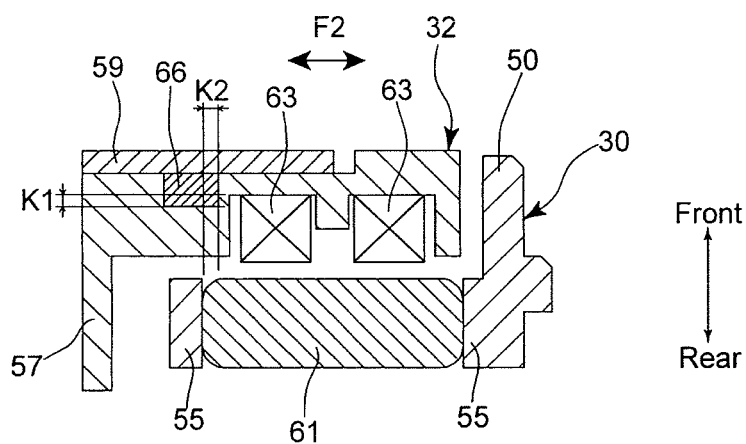
FIG. 11 is a sectional view taken along the line XI-XI shown in FIG. 7, illustrating another portion of the electromagnetic actuator, and the vicinity thereof, with the covering member mounted.

As shown in FIG. 4, a circuit board 59 is fixed to a portion of the front wall 56 of the cover member 32 which does not overlap the photographic aperture 58. As shown in FIGS. 10 and 11, the coils 62 and 63 that constitute elements of the electromagnetic actuator are fixed to the rear side of the front wall 56 and are electrically connected to the circuit board 59. As shown in FIGS. 7 and 12, each of the coils 62 and 63 is an air-core coil which includes a pair of linear portions that are substantially parallel to each other and a pair of curved (U-shaped) portions which connect the pair of linear portions at the respective ends thereof. The coils 62 and 63 are substantially identical in shape and size to each other and are symmetrically arranged with respect to the first reference plane P1. Specifically, in the anti-shake initial state, the long axis (major axis) of the coil 62, which is parallel to the linear portions of the coil 62 and passes through the air core of the coil 62, and the long axis (major axis) of the coil 63, which is parallel to the linear portions of the coil 63 and passes through the air core of the coil 63, correspond to the magnetic pole boundary line Q1 of the permanent magnet 60 and the magnetic pole boundary line Q2 of the permanent magnet 61, respectively, as viewed from the front, as shown in FIGS. 7 and 12. In other words, the coils 62 and 63 are arranged to be inclined to each other so that the distance between the long axis of the coil 62 and the long axis of the coil 63 gradually increases in a direction from left to right, similar to the permanent magnets 60 and 61. The inclination angles of the long axes of the coils 62 and 63 with respect to the first reference plane P1 are set to approximately ±45 degrees, respectively. Namely, the coils 62 and 63 are arranged so that the lengthwise directions (the long axes) thereof are substantially orthogonal to each other.

The energization of the coils 62 and 63 is controlled via the circuit board 59. A driving force is generated in a direction substantially orthogonal to the magnetic pole boundary line Q1 of the permanent magnet 60 (i.e., orthogonal to the direction of the long axis of the coil 62) in a plane orthogonal to the first optical axis O1 upon the coil 62 being energized. The direction of action of this driving force is shown by a double-headed arrow F1 in FIGS. 7, 10, 12 and 13. On the other hand, a driving force is generated in a direction substantially orthogonal to the magnetic pole boundary line Q2 of the permanent magnet 61 (i.e., orthogonal to the direction of the long axis of the coil 63) in a plane orthogonal to the first optical axis O1 upon the coil 63 being energized. The direction of action of this driving force is shown by a double-headed arrow F2 in FIGS. 7, 11, 12 and 13. The direction of action F1 of the driving force generated by energizing the coil 62 is substantially parallel to the lengthwise direction of the pivot support groove 54, and the first lens frame 30 performs the linear moving operation J1, in which the first lens frame 30 moves linearly along the lengthwise direction of the pivot support groove 54 relative to the base member 31, upon the coil 62 being energized. On the other hand, the direction of action F2 of the driving force generated by energizing the coil 63 is substantially orthogonal to the lengthwise direction of the pivot support groove 54, and the pivot groove 54 is prevented from moving relative to the swing pivot 44 in this orthogonal direction, and accordingly, the first lens frame 30 performs the swinging operation J2, in which the first lens frame 30 rotates (swings) about the swing pivot 44 relative to the base member 31 of the first lens frame 30, upon the coil 63 being energized. The first lens frame 30 can be moved to any arbitrary position in a plane orthogonal to the first optical axis O1 with respect to the base member 31 by a combination of controlling the passage of current through the coils 62 and 63. As described above, the moving range of the first lens frame 30 with respect to the base member 31 is limited by engagement of the movement limit projection 43 with the inner wall of the movement limit hole 53.

Reference character U1 shown in FIGS. 7, 12 and 13 designates the centers of the permanent magnet 60 and the coil 62 (the centers of the outer shapes thereof) in a plane orthogonal to the first optical axis O1. Likewise, reference character U2 shown in FIGS. 7, 12 and 13 designates the centers of the permanent magnet 61 and the coil 63 (the centers of the outer shapes thereof) in a plane orthogonal to the first optical axis O1. Each permanent magnet 60 and 61 is substantially square in shape as viewed from front. The center U1 of the permanent magnet 60 corresponds to both the center of the permanent magnet 60 in a direction along the magnetic pole boundary line Q1 and the center of the permanent magnet 60 in a direction orthogonal to the magnetic pole boundary line Q1. The center U2 of the permanent magnet 61 corresponds to both the center of the permanent magnet 61 in a direction along the magnetic pole boundary line Q2 and the center of the permanent magnet 61 in a direction orthogonal to the magnetic pole boundary line Q2. The center U1 of the coil 62 corresponds to both the center of the coil 62 in the lengthwise (long-side) direction thereof along the long axis of the coil 62 and the center of the coil 62 in the short-side direction thereof that is orthogonal to the long axis of the coil 62. The center U2 of the coil 63 corresponds to both the center of the coil 63 in the lengthwise (long-side) direction thereof along the long axis of the coil 63 and the center of the coil 63 in the short-side direction thereof that is orthogonal to the long axis of the coil 63. In the anti-shake initial state that is shown in FIGS. 7, 12 and 13, the center U1 of the permanent magnet 60 and the center U1 of the coil 62 are coincident with each other (i.e., the center U1 of the permanent magnet 60 and the center U1 of the coil 62 are aligned in the forward/rearward direction), and the center U2 of the permanent magnet 61 and the center U2 of the coil 63 are coincident with each other (i.e., the center U2 of the permanent magnet 61 and the center U2 of the coil 63 are aligned in the forward/rearward direction). A movement of the first lens frame 30 which is caused by the passage of current through the coils 62 and 63 causes the positions of the centers U1 and U2 of the permanent magnets 60 and 61 with respect to the centers U1 and U2 of the coils 62 and 63 to change, respectively. As shown in FIGS. 7, 12 and 13, a first plane H1 which is parallel to the first optical axis O1 and extends in the direction of action F1 while passing through both the center U1 of the permanent magnet 60 and the center U1 of the coil 62 in the anti-shake initial state, and a second plane H2 which is parallel to the first optical axis O1 and extends in the direction of action F2 while passing through both the center U2 of the permanent magnet 61 and the center U2 of the coil 63 in the anti-shake initial state intersect each other at a point of intersection E on the first reference plane P1.

In addition, a magnetic sensor 65 and a magnetic sensor 66 are mounted to and supported by the rear of the circuit board 59 as shown in FIGS. 10 and 11. Each of the two magnetic sensors 65 and 66 is composed of a Hall sensor connected to the circuit board 59. As viewed from the front, as shown in FIGS. 7 and 12, the magnetic sensor 65 is disposed on the opposite side of the coil 62 in the direction of action F1 from the first lens element L1 (on the side farther from the first optical axis O1) and is adjacent to the linear portion of the coil 62, and the magnetic sensor 65 and the coil 62 overlap each other as viewed in the direction of action F1 (see FIG. 10). Similarly, as viewed from front as shown in FIGS. 7 and 12, the magnetic sensor 66 is disposed on the opposite side of the coil 63 in the direction of action F2 from the first lens element L1 side (on the side farther from the first optical axis O1) to be adjacent to the linear portion of the coil 63, and the magnetic sensor 66 and the coil 63 overlap each other as viewed in the direction of action F2 (see FIG. 11). The reference character K1 shown in FIG. 10 designates the overlapping range between the magnetic sensor 65 and the coil 62 and the reference character K1 shown in FIG. 11 designates the overlapping range between the magnetic sensor 66 and the coil 63.

When the cover member 32 is mounted to the base member 31, the magnetic sensors 65 and 66 are positioned in the vicinity of the permanent magnets 60 and 61, respectively. As shown in FIGS. 10 and 11, the magnetic sensors 65 and 66 are positioned in front of the permanent magnets 60 and 61, respectively, with respect to the forward/rearward direction of the imaging unit 10 along the first optical axis O1. As shown in FIG. 10, in the direction of action F1, the width of the permanent magnet 60 is greater than the width of the coil 62 in the short-side direction thereof so that both ends of the permanent magnet 60 project from both ends of the coil 62 in the direction of action F1, and one of the projecting ends of the permanent magnet 60 which is farther from the first optical axis O1 (farther from the first lens element L1) (i.e., the right end of the permanent magnet 60 with respect to FIG. 10) and the magnetic sensor 65 overlap each other as viewed from the front. As shown in FIG. 11, in the direction of action F2, the width of the permanent magnet 61 is greater than the width of the coil 63 in the short-side direction thereof so that both ends of the permanent magnet 61 project from both ends of the coil 63 in the direction of action F2, and one of the both projecting ends of the permanent magnet 61 which is farther from the first optical axis O1 (farther from the first lens element L1) (i.e., the left end of the permanent magnet 61 with respect to FIG. 11) and the magnetic sensor 66 overlap each other as viewed from front. The reference character K2 shown in FIG. 10 designates the overlapping range between the magnetic sensor 65 and the permanent magnet 60 and the reference character K2 shown in FIG. 11 designates the overlapping range between the magnetic sensor 66 and the permanent magnet 61.

As shown in FIGS. 7 and 12, each of the two magnetic sensors 65 and 66 has a narrow rectangular shape in a front orthographic projection, and the reference characters U3 and U4 shown in FIGS. 7 and 12 designate the centers of the magnetic sensors 65 and 66 in a plane orthogonal to the first optical axis O1, respectively. The lengthwise direction of the magnetic sensor 65 is substantially parallel to the magnetic pole boundary line Q1 and the lengthwise direction of the magnetic sensor 66 is substantially parallel to the magnetic pole boundary line Q2. Variation in position of the permanent magnet 60 in accordance with movement of the first lens frame 30 that is caused by the electromagnetic actuator causes the output of the magnetic sensor 65 to vary, and variation in position of the permanent magnet 61 in accordance with movement of the first lens frame 30 that is caused by the electromagnetic actuator causes the output of the magnetic sensor 66 to vary. Hence, the position of the first lens frame 30 can be detected from the output variations of the two magnetic sensors 65 and 66. Upon start-up of the imaging unit 10, the calibration of each magnetic sensor 65 and 66 is performed by driving the first lens frame 30 to a moving end thereof defined by the movement limit projection 43 and the movement limit hole 53.

As shown in FIGS. 7, 12 and 13, the center U3 of the magnetic sensor 65 in a plane orthogonal to the first optical axis O1 lies in the first plane H1 which extends in the direction of action F1, and the center U4 of the magnetic sensor 66 in a plane orthogonal to the first optical axis O1 lies in the second plane H2 which extends in the direction of action F2. Although the centers U3 and U4 of the magnetic sensors 65 and 66 are spaced from the centers U1 and U2 of the permanent magnets 60 and 61 in the first plane H1 and the second plane H2, respectively, as shown in FIGS. 7 and 12, since each magnetic sensor 65 and 66 is positioned close to the associated permanent magnet 60 or 61 to a degree to be partly included in the front orthographic projection area of the associated permanent magnet 60 or 61 as shown in FIGS. 10 and 11 as the overlapping range K2, the magnetic sensors 65 and 66 can achieve a sufficient detection accuracy.

The position of the first lens frame 30 can be detected even if the magnetic sensors 65 and 66 are positioned behind the magnetic sensors 60 and 61 in a direction along the first optical axis O1, unlike the above described embodiment. However, in this case, it is required to provide space for the installation of the sensors behind the permanent magnets 60 and 61. In contrast, according to the arrangement of the magnetic sensors 65 and 66 in the above illustrated embodiment of the imaging apparatus, no space for the installation of the sensors is required behind the permanent magnets 60 and 61, and an effect of reducing the thickness of a portion of the imaging unit 10 in the vicinity of the electromagnetic actuator in the forward/rearward direction can also be obtained. Specifically, further slimming of this portion of the imaging unit 10 is achieved because the magnetic sensor 65 and the coil 62 overlap each other and the magnetic sensor 66 and the coil 63 overlap each other in a direction along the first optical axis O1 in the overlapping range K1, as shown in FIGS. 10 and 11.

In the first lens-group unit 12, the first lens frame 30, which supports the first lens element L1 and the permanent magnets 60 and 61, is a movable part that moves to reduce image shake, and the center of gravity of this movable part (in a plane orthogonal to the first optical axis O1) is designated by a reference letter Z in FIGS. 7, 12 and 13.

If the imaging unit 10, which is completely assembled by mounting the first lens-group unit 12 which has the above described structure to the body module 11, is pointed at an object located in front of the imaging unit 10, light reflected by the object (light emanating from a photographic object) enters the first prism L11 through the incident surface L11-a after passing through the first lens element L1 and is reflected at an angle of 90 degrees by the reflecting surface L11-c of the first prism L11 and travels toward the exit surface L11-b. Subsequently, the reflected light that emerges from the exit surface L11-b of the first prism L11 enters the second prism L12 from the incident surface L12-a after passing through the second lens element L2, the second lens group G2, the third lens group G3 and the fourth lens group G4, and is reflected at an angle of 90 degrees by the reflecting surface L12-c of the second prism L12 and travels toward the exit surface L12-b. Subsequently, the reflected light emerges from the exit surface L12-b and is captured (received) by the imaging surface of the image sensor IS. A zooming operation of the imaging optical system of the imaging unit 10 is performed by moving the second lens group G2 and the third lens group G3 along the pair of rods 22 and 23 using the first motor M1 and the second motor M2. A focusing operation of the imaging optical system of the imaging unit 10 is performed by moving the third lens group G3 along the pair of rods 22 and 23 using the second motor M2. By performing these zooming and focusing operations, focused object images can be captured at selected angle of view.

Additionally, in the imaging unit 10, an anti-shake (image shake correction/image-stabilizing/shake reduction) operation is performed using the first lens element L1 of the first lens group G1 that is positioned in front of the first prism L11. As described above, the anti-shake system supports the first lens frame 30 in a manner to allow the first lens frame 30 to move relative to the base member 31, which is fixed with respect to the housing 13, in a plane orthogonal to the first optical axis O1 and drives the first lens frame 30 using the electromagnetic actuator.

The moving direction of the first lens element L1 during an anti-shake operation is orthogonal to the first optical axis O1. Namely, the first lens frame 30 that holds the first lens element L1 does not move in the forward/rearward direction that corresponds to the direction of the thickness of the imaging unit 10. In addition, a support mechanism (which includes the guide support portions 40A, 40B and 40C, the guide shafts 41A, 41B and 41C, the cutouts 42A, 42B and 42C, the movement limit projection 43, the swing pivot 44, the slidable support portions 51A, 51B and 51C, the movement limit hole 53, the pivot support groove 54, etc.) and a driver (which includes the permanent magnets 60 and 61, the coils 62 and 63, etc.) which are for moving the first lens frame 30 relative to the base member 31 are arranged at positions about the first optical axis O1 that surround the first lens element L1, so that the installation space for the support mechanism and the driver is small with respect to the forward/rearward direction of the imaging unit 10. Accordingly, the selection of the first lens element L1 as an anti-shake optical element makes it possible to slim down the imaging unit 10 in the forward/rearward direction even though the imaging unit 10 is provided with an anti-shake system. For instance, unlike the present embodiment, if an anti-shake system were to move the second lens group G2 or the third lens group G3 in directions orthogonal to the second optical axis O2 to cancel out image shake, securing room for the second lens group frame 20 or the third lens group frame 21 and installing the driver for the second lens group frame 20 or the third lens group frame 21 would require a greater installation space for the anti-shake system in the housing 13 in the forward/rearward direction than in the case of the above described illustrated embodiment, thus increasing the thickness of the imaging unit 10.

The first lens element L1 that is supported by the first lens frame 30 does not need to be connected to any circuit board, unlike an electrical component such as the imaging sensor IS, so that the structure of the imaging unit 10 does not become complicated due to routing of a flexible wiring board, or a flexible wiring board does not exert resistance on the first lens element L1 during an anti-shake operation. For instance, unlike the present embodiment, if the anti-shake system were to move the image sensor IS in directions orthogonal to the third optical axis O3 to cancel out image shake, the flexible wiring board to which a circuit board and the imaging sensor IS are connected is required to have a sufficient length so as not to provide resistance to movement of the image sensor IS; however, there is not much space around the image sensor IS, so that the flexible wiring board would interfere with other members if the flexible wiring board is made long. If the image sensor IS and the circuit board are spaced from each other in the forward/rearward direction in order to prevent this problem from occurring, this spacing conflicts with the slimming down of the imaging unit 10.

The selection of the first lens element L1 as an anti-shake optical element avoids the above described problems and makes it possible to achieve a simple anti-shake system which contributes to the slimming down of the imaging unit 10. Since only the first lens element L1 is driven during the anti-shake control, rather than the entire first lens group G1, there is the advantage of the moving parts of the anti-shake system being able to be provided in a compact manner and the driving load thereon can be small. In typical anti-shake systems, if only a part (e.g., one lens element) of a lens group is driven in directions orthogonal to the optical axis thereof, there is a possibility of aberrations in the imaging optical system increasing (thereby deteriorating the optical performance of the imaging optical system) and thus causing the imaging optical system to become impractical to use. In this connection, since the first prism L11 that functions only to reflect the incident light rays is disposed between the first lens element L1 and the second lens element L2 (that are optical elements having refractive powers) in the first lens group G1 in the present embodiment, the distance between the first lens element L1 and the second lens element L2 is great, so that an increase in aberration is reduced (deterioration of the optical performance of the imaging optical system is minimized) even though the first lens element L1 is solely moved to perform anti-shake control. Accordingly, a satisfactory optical performance can be secured for an anti-shake operation even if the first lens element L1 and the second lens element L2, which are spaced far from each other in the optical axis direction with the first prism L11 positioned therebetween, are treated as different lens groups, even though the aberration is controlled over the entire first lens group G1, which includes the first lens element L1, the first prism L11 and the second lens element L2, in an imaging optical system; hence, only the first lens element L1 is set as an optical element used for anti-shake operation in the present embodiment.

Unlike telescopic lens barrels in which the length in an optical axis direction (the distance between the image plane and the lens element closest to the object side) varies when a zooming operation or a barrel retracting operation is performed, the length of the optical path from the incident surface of the first lens element L1 to the image plane (the imaging surface of the image sensor IS) in the imaging unit 10 is constant at all times. Therefore, it is possible to embed the imaging unit 10 into a mobile electronic device and cover the front of the first lens element L1 with a protection glass or the like, and no practical problem arises even if the first lens element L1 of the optical system of the imaging unit 10, which is located closest to the object side, is driven to cancel out image shake.

As mentioned above, even though only a part of a lens group is driven in the above described structure, in which the first lens element L1, which is an element of the first lens group LG1 and positioned in front of the first prism L11, is solely driven to reduce image shake, such a configuration does not easily influence the aberrations of the imaging optical system. However, since the first lens element L1 is required to have a higher operating accuracy than that of an anti-shake system in which an entire lens group is driven to reduce image shake, it is required to precisely support and drive the first lens frame 30, which holds the first lens element L1, to stabilize the anti-shake performance and the optical performance. Additionally, in regard to the driving of the first lens element L1 to reduce image shake, which is the greatest in diameter among all the lens elements of the imaging optical system, it is required to make the anti-shake system as compact as possible so as to contribute to miniaturization of the imaging unit. Features of this anti-shake system will be described hereinafter.

When four quadrants V1, V2, V3 and V4, which can be divided from each other by the first reference plane P1 and the second reference plane P2, are determined with respect to a front view as shown in FIGS. 7, 12 and 13, on the premise of the following descriptions, the first quadrant V1 and the fourth quadrant V4 are positioned on the side of the second reference plane P2 (the right side of the second reference plane P2 with respect to FIGS. 7, 12 and 13) toward the light-ray travelling direction along the second optical axis O2 upon the light rays being reflected by the first prism L11, while the second quadrant V2 and the third quadrant V3 are positioned on the opposite side (the left side of the second reference plane P2 with respect to FIGS. 7, 12 and 13) of the second reference plane P2 from the first quadrant V1 and the fourth quadrant V4. The area of a combination of the second quadrant V2 and the third quadrant V3, which are positioned on the left side of the second reference plane P2, will be hereinafter referred to as the first section, and the area of a combination of the first quadrant V1 and the fourth quadrant V4, which are positioned on the right side of the second reference plane P2, will be hereinafter referred to as the second section.

Out of the first and second sections on the opposite sides of the second reference plane P2, in the second section (which includes the first quadrant V1 and the fourth quadrant V4), optical elements of the imaging optical system such as the second lens element L2, the second lens group G2, the third lens group G3, the fourth lens group G4 and the second prism L12 are arranged along the second optical axis O2. The pair of rods 22 and 23, the first motor M1 and the second motor M2, which constitute elements of an advancing/retracting drive mechanism for moving the second lens group G2 and the third lens group G3 along the second optical axis O2, are also arranged in the second section.

On the other hand, out of the first and second sections on the opposite sides of the second reference plane P2, in the first section (which includes the second and third quadrants V2 and V3), the permanent magnets 60 and 61 and the coils 62 and 63, which constitute the electromagnetic actuator for driving the first lens element L1 to reduce image shake, and the magnetic sensors 65 and 66, which are for detecting the position of the first lens element L1 during driving thereof, are arranged. More specifically, the permanent magnet 60, the coil 62 and the magnetic sensor 65 are positioned in the second quadrant V2; the permanent magnet 61, the coil 63 and the magnetic sensor 66 are positioned in the third quadrant V3; and each of the elements in the second quadrant V2 and each of the elements in the third quadrant V3 are arranged to be substantially symmetrical with respect to the first reference plane P1. The permanent magnets 60 and 61 are arranged so that the inclination angles of the magnetic pole boundary lines Q1 and Q2 thereof are approximately ±45 degrees, respectively, with respect to the first reference plane P1 as described above, and the directions of inclination of the magnetic pole boundary lines Q1 and Q2 are set to approach the first reference plane P1 (so as to reduce the distance between the magnetic pole boundary lines Q1 and Q2) in the leftward direction away from the second reference plane P2. Likewise, the coils 62 and 63 are arranged so that the inclination angles of the long axis of the coil 62 and the long axis of the coil 63 become approximately ±45 degrees, respectively, with respect to the first reference plane P1, and the directions of inclination of the long axes of the coils 62 and 63 are set to approach the first reference plane P1 (so as to reduce the distance between the long axes of the coils 62 and 63) in the leftward direction away from the second reference plane P2. In other words, the point of intersection between two straight lines respectively extending along the magnetic pole boundary lines Q1 and Q2 and the point of intersection between two straight lines respectively extending along the long axes of the coils 62 and 63 are positioned in the first section (on the left side of the second reference plane P2), which is on the opposite side of the second reference plane P2 to that in which the second optical axis O2 extends.

The following effects are obtained by the above described arrangement of the permanent magnets 60 and 61 and the coils 62 and 63, which constitute elements of the anti-shake system for driving the first lens element L1. The arrangement of the electromagnetic actuator is not easily subjected to space restrictions because the first section, which includes the second quadrant V2 and the third quadrant V3, is a section on the opposite side of the second reference plane P2 from the side toward the light-ray travelling direction along the second optical axis O2 and because none of the optical elements of the imaging optical system which are positioned optically rearward from the first prism L11 (rightward with respect to FIG. 3) are arranged in either the second quadrant V2 or the third quadrant V3. For instance, it is possible to drive the first lens element L1 even if a combination of the permanent magnet 60 and the coil 62 and a combination of the permanent magnet 61 and the coil 63 are arranged in the second section (which includes the first quadrant V1 and the fourth quadrant V4) to be symmetrical with respect to the above described (illustrated) arrangement about the second reference plane P2. However, the second lens element L2 is positioned in the first quadrant V1 and the fourth quadrant V4 at a position adjacent to the exit surface L11-b of the first prism L11, so that in this case there is a problem of it being difficult to secure space for installing the entire electromagnetic actuator without interfering with the second lens element L2. Whereas, there is no such a restriction in the arrangement of the illustrated embodiment in which a combination of the permanent magnet 60 and the coil 62 provided in the second quadrant V2 and a combination of the permanent magnet 61 and the coil 63 provided in the third quadrant V3.

In general, to drive an object using voice coil motors, each of which includes a permanent magnet and a coil, two sets of permanent magnets and coils which have mutually different driving-force directions are used. The present embodiment of the imaging apparatus is provided with a combination of the permanent magnet 60, which contains the magnetic boundary line Q1, and the coil 62, the lengthwise (long-side) direction of which is parallel to the magnetic boundary line Q1, and a combination of the permanent magnet 61, which contains the magnetic boundary line Q2, and the coil 63, the lengthwise (long-side) direction of which is parallel to the magnetic boundary line Q2, and the direction of action F1 of the driving force generated by the former combination (the permanent magnet 60 and the coil 62) and the direction of action F2 of the driving force generated by the latter combination (the permanent magnet 61 and the coil 63) are orthogonal to each other. This arrangement makes it possible to move the first lens element L1 to a desired position in a plane orthogonal to the first optical axis O1. In addition, the directions of inclination of the former combination (the permanent magnet 60 and the coil 62) and the latter combination (the permanent magnet 61 and the coil 63) are set so that the distance between the magnetic pole boundary lines Q1 and Q2 and the distance between the long axes of the coils 62 and 63 increase in the rightward direction (in which the second optical axis O2 extends) and so that the distance between the magnetic pole boundary lines Q1 and Q2 and the distance between the long axes of the coils 62 and 63 decrease in the opposite direction, i.e., the leftward direction. This arrangement makes it possible to accommodate the permanent magnet 60 and the coil 62 in the second quadrant V2 and the permanent magnet 61 and the coil 63 in the third quadrant V3 in an area that is peripheral to the lens holding portion 50 of the first lens frame 30, which is cylindrical in shape.

It is possible to make the directions of inclination of the permanent magnet 60 and the coil 62 and the permanent magnet 61 and the coil 63 with respect to the first reference plane P1 different from those in the above described embodiment for the sole purpose of driving the first lens element L1. For instance, it is possible to drive the first lens element L1 in a plane orthogonal to the first optical axis O1 even if the magnetic pole boundary line Q1 of the permanent magnet 60 and the long axis of the coil 62 are parallel to one of the reference planes P1 and P2 and the magnetic pole boundary line Q2 of the permanent magnet 61 and the long axis of the coil 63 are parallel to the other reference plane P1 or P2. However, this arrangement causes at least one of a combination of the permanent magnet 60 and the coil 62 and a combination of the permanent magnet 61 and the coil 63 to enter the first quadrant V1 or the fourth quadrant V4 by a large amount, which deteriorates the aforementioned effect of using the second quadrant V2 and the third quadrant V3 that are subjected to less space restrictions. In addition, there is also the demerit of the anti-shake system being increased in size in a direction along the first reference plane P1 because either a combination of the permanent magnet 60 and the coil 62 or a combination of the permanent magnet 61 and the coil 63 is positioned on the left-hand side of the movement limit projection 43 and the movement limit hole 53 with respect to FIGS. 7, 12 and 13.

In contrast, the anti-shake system can be installed in the second quadrant V2 and the third quadrant V3 in a space-efficient manner by setting the directions of inclination of the permanent magnets 60 and 61 and the coils 62 and 63 in a front view as shown in FIGS. 7, 12 and 13 as described in the above illustrated embodiment.

Additionally, the second lens group G2 and the third lens group G3 that are movable along the second optical axis O2 are provided on an optical path extending from the first prism L11; the first motor M1 and the second motor M2, which constitute members of the advancing/retracting drive mechanism for moving the second lens group G2 and the third lens group G3 along the second optical axis O2, contain metal parts; and the pair of rods 22 and 23 are also metal parts. If these metal parts are made of a magnetic material and are positioned near the electromagnetic actuator, there is a possibility of such metal parts exerting an adverse influence on the anti-shake driving operation of the electromagnetic actuator. In the moving-magnet electromagnetic actuator of the present embodiment of the anti-shake system in particular, in which the permanent magnets 60 and 61 are supported on the moveable first lens frame 30, in order to make the electromagnetic actuator perform drive control with high precision, it is required to remove the adverse influence caused by external magnetic materials on the magnetic fields of the permanent magnets 60 and 61. The permanent magnets 60 and 61 and the coils 62 and 63 that are arranged in the second quadrant V2 and the third quadrant V3 are farther from each motor M1 and M2 and each rod 22 and 23 than in the case where the permanent magnets 60 and 61 and the coils 62 and 63 were to be arranged in the first quadrant V1 and the fourth quadrant V4; therefore, any adverse influence of these parts of the electromagnetic actuator would not easily reach the driving of the electromagnetic actuator even when these parts contain magnetic metal.

When viewing the first lens-group unit 12 from the front along the first optical axis O1, it is possible to define an imaginary triangle with the three support points 45A, 45B and 45C (which support the first lens frame 30 in a manner to allow the first lens frame 30 to move relative to the base frame 31) as the apexes of the imaginary triangle. The inside region of this imaginary triangle will be hereinafter referred to as the support intra-region 46. The imaginary triangle that forms the support intra-region 46 is an isosceles triangle in which one side which connects the support points 45A and 45C and another side which connects the support points 45B and 45C are equal in length. The permanent magnet 60 and the coil 62 are arranged along the side of the imaginary triangle which connects the support points 45A and 45C, and the permanent magnet 61 and the coil 63 are arranged along the side of the imaginary triangle which connects the support points 45B and 45C. In the anti-shake initial state, the side of the imaginary triangle which connects the support points 45A and 45B lies on the second reference plane P2, and the support intra-region 46 is completely positioned within the second quadrant V2 and the third quadrant V3, i.e., in the first section.

As can be seen from FIGS. 12 and 13, a point of intersection E between the first plane H1 and the second plane H2, which respectively extend in the direction of action F1 and the direction of action F2, the center of gravity Z of the movable part (which includes the first lens frame 30) that moves to reduce image shake, and the movement limit hole 53 are all positioned in the support intra-region 46. In addition, part of the permanent magnets 60 and 61 and part of the coils 62 and 63 are also positioned in the support intra-region 46.

As described above, an electromagnetic actuator which is superior in space utilization can be constructed by arranging the permanent magnets 60 and 61 in the second quadrant V2 and the third quadrant V3, respectively, so that the directions of inclination of the magnetic pole boundary lines Q1 and Q2 are determined so as to reduce the distance between the magnetic pole boundary lines Q1 and Q2 in the leftward direction away from the second reference plane P2 and by arranging the coils 62 and 63 in the second quadrant V2 and the third quadrant V3, respectively, so that the directions of inclination of the long axes of the coils 62 and 63 are determined so as to reduce the distance between the long axes of the coils 62 and 63 in the leftward direction away from the second reference plane P2. In addition, by positioning the point of intersection E between the first plane H1 and the second plane H2, which respectively extend in the direction of action F1 and the direction of action F2, in the support intra-region 46 so as to reduce the distance between a first actuator (a combination of the permanent magnet 60 and the coil 62) and a second actuator (a combination of the permanent magnet 61 and the coil 63) (the distance in the upward/downward direction between these combinations on the opposite side of the first reference plane P1), the electromagnetic actuator which drives the first lens frame 30 can be further miniaturized in the upward/downward direction. Unlike this structure, if the configuration of the electromagnetic actuator is such that the point of intersection E is positioned in the first quadrant V1 or the fourth quadrant V4 (i.e., in the second section) to the right side of the support intra-region 46 while maintaining a relative angle (90° in the illustrated embodiment) between the first and second actuators, the distance in the upward/downward direction between the combination of the permanent magnet 60 and the coil 62 and the combination of the permanent magnet 61 and the coil 63 becomes greater, which causes an increase in size of the anti-shake system. Additionally, even in the second quadrant V2 or the third quadrant V3 on the left side of the second reference plane P2, if the point of intersection E is positioned outside the support intra-region 46, it is difficult to drive the first lens frame 30 in an appropriate manner while maintaining a compact arrangement of the electromagnetic actuator. Accordingly, the electromagnetic actuator can be made to perform drive control with high precision while making the drive mechanism for the first lens frame 30 compact in size by arranging the electromagnetic actuator so that the point of intersection E is positioned in the support intra-region 46.

Additionally, the above described arrangement in which the movement limit projection 43 and the movable limit hole 53 are positioned in the support intra-region 46 between the combination of the permanent magnet 60 and the coil 62 and the combination of the permanent magnet 61 and the coil 63 makes it possible to determine the range of movement of the first lens frame 30 with space efficiency.

As shown in FIGS. 7, 12 and 13, a distance R1 from the center (axis) of the swing pivot 44, which serves as a pivot about which the first lens frame 30 swings (the swinging operation J2), to the first optical axis O1 is smaller than a distance R2 from the center (axis) of the swing pivot 44 to the point of intersection E between the first plane H1 and the second plane H2 (R1<R2: first condition). In addition, a distance W1 from the point of intersection E to the center of gravity Z is smaller than a distance W2 from the point of intersection E to the first optical axis O1 (W1<W2: second condition). Namely, the point of intersection E, at which the first plane H1 (which extends in the direction of action F1) and the second plane H2 (which extends in the direction of action F2) intersect each other, is determined to satisfy the first condition (R1<R2), in which the distance R2 from the swinging center of the first lens frame 30 (i.e., the axis of the swing pivot 44) to the point of intersection E is greater than the distance R1 from the swinging center of the first lens frame 30 (i.e., the axis of the swing pivot 44) to the first optical axis O1, and the second condition (W1<W2), in which the point of intersection E is closer to the center of gravity Z than the first optical axis O1. This determining of the point of intersection E makes it possible to drive the first lens frame 30 with a small thrust force (driving force) using the principle of leverage when the first lens frame 30 is made to perform swinging operation J2, thus making it possible to achieve an improvement in performance of anti-shake operation and a reduction of power consumption. In the present embodiment of the imaging unit 10, such a structure which has an improved driving efficiency is particularly effective for anti-shake operation because the first lens element L1, which is relatively great in diameter and weight, is driven to perform an anti-shake operation. This effect is obtained by satisfying at least the first condition (R1<R2), and an effect higher than this effect is obtained by satisfying the second condition (W1<W2) in addition to the first condition. Additionally, although the point of intersection E and the center of gravity Z are positioned in that order from the first optical axis O1 side in the present embodiment of the imaging apparatus, a similar effect is also obtained in the case where the point of intersection E is positioned farther from the first optical axis O1 than the center of gravity Z by satisfying the second condition (W1<W2), i.e., by making the distance W1 from the point of intersection E to the center of gravity Z smaller than the distance W2 from the point of intersection E to the first optical axis O1.

The centers U3 and U4 of the magnetic sensors 65 and 66 lie in the first plane H1 and the second plane H2, respectively, and the position of the first lens frame 30 is detected by the magnetic sensors 65 and 66 in directions along the first plane H1 and the second plane H2, respectively. Accordingly, the first plane H1 and the second plane H2 are surfaces which pass through the centers U1 and U2 of the electromagnetic actuators and extend in the direction of action F1 and the direction of action F2, respectively, and are coincident with the directions in which the magnetic sensors 65 and 66 detect the position of the first lens frame 30, respectively, and the position of the first lens frame 30 is detected with reference to the point of intersection E between the first plane H1 and the second plane H2. Specifically, the magnetic sensor 65 detects the position of the first lens frame 30 in a direction along the first plane H1, while the magnetic sensor 66 detects the position of the first lens frame 30 in a direction along the second plane H2.

Out of the moving operations of the first lens frame 30, in the linear moving operation J1, all points on the first lens frame 30 are moved by the same amount of movement, and accordingly, the accuracy of detecting the position of the first lens frame 30 is invariant even if the position of the first lens frame 30 is detected with reference to any part. On the other hand, in the swinging operation J2, the amount of movement of the first lens frame 30 in the rotational direction thereof per unit of rotational angle varies (the amount of movement of the first lens frame 30 in the rotational direction thereof per unit of rotational angle increases as the distance from the swing pivot 44 increases) depending on the size of the turning radius from the swing pivot 44, which is the rotational center of the first lens frame 30, and accordingly, a variation of the reference position for detecting the position of the first lens frame 30 influences the detection accuracy. As described above, the distance R1 from the center of the swing pivot 44 to the first optical axis O1 is smaller than the distance R2 from the center of the swing pivot 44 to the point of intersection E (R1<R2). Conventionally, in the case of detecting movement of a movable optical element (e.g., the first lens element L1) in a direction orthogonal to the optical axis thereof, it has been known in the art to detect the position of the movable optical element using a detector with reference to the optical axis passing through the optical element (e.g., the first optical axis O1). Whereas, unlike such a known configuration, by satisfying the first condition (R1<R2), the position of the first lens frame 30 is detected by the magnetic sensors 65 and 66 with reference to a position (the point of intersection E) where the amount of movement of the first lens frame 30 in the rotational direction thereof about the swing pivot 44 per unit of rotational angle is greater than a point on the optical axis, so that the position of the first lens frame 30 can be detected with high precision when the first lens frame 30 performs the swinging operation J2.

Unlike the present embodiment, if the first lens frame 30 can freely move with no constraints to the moving direction thereof in a plane orthogonal to the first optical axis O, the position of the first lens frame 30 needs to be detected with reference to the first optical axis O1; however, in a configuration like that of the present embodiment in which the moving direction of the first lens frame 30 is specified by the linear moving operation J1 and the swinging operation J2, it is possible to control the operation of the first lens frame 30 with reference to the point of intersection E, which is different from the first optical axis O1.

The swing pivot 44 and the pivot support groove 54, which guide the linear moving operation J1 and the swinging operation J2 of the first lens frame 30, are arranged in the fourth quadrant V4 on the right side of the second reference plane P2 and are positioned outside the support intra-region 46. As shown in FIG. 13, in the fourth quadrant V4, the swing pivot 44 and the pivot support groove 54 are positioned in a space (this space is hatched in FIG. 13) between the lens holding portion 50 of the first lens frame 30 and a square (imaginary square) 47 in which the imaginary lens holding opening 50$b$ of the lens holding portion 50 is inscribed. The imaginary lens holding opening 50$b$-1 is an assumed (imaginary) shape of the lens holding opening 50$b$ in the case where the cylindrical lens holding portion 50 is formed to have no linear-cut portion corresponding to the linear-cut portion 50$a$ so that the cylindrical lens holding portion 50 has a perfect circular cylindrical shape. The providing of the swing pivot 44 and the pivot support groove 54 at this position makes it possible to achieve a space-efficient arrangement thereof without interfering with either optical elements such as the first lens element L1 and the second lens element L2 or the electromagnetic actuator which drives the first lens frame 30, and satisfies the first condition (R1<R2) to contribute to an achievement of a high-precision drive mechanism for the first lens frame 30.

As described above, in the arrangement of the anti-shake system for driving the first lens element L1, the anti-shake system that is superior in space utilization and driving performance is obtained by installing the permanent magnets 60 and 61 and the coils 62 and 63 in the sections (the second quadrant V2 and the third quadrant V3) on the opposite side of the second reference plane P2 from the side toward the light-ray travelling direction along the second optical axis O2, and determining the point of intersection E and the center of gravity Z in the above described manner after arranging the permanent magnets 60 and 61 and the coils 62 and 63 so that the distance between the magnetic pole boundary lines Q1 and Q2 and the distance between the long axes of the coils 62 and 63 decrease in the direction opposite to the direction of extension of the second optical axis O2.

Although the present invention has been described based on the above illustrated embodiment, the present invention is not limited solely thereto; various modifications to the above illustrated embodiment are possible. For instance, although the imaging optical system of the above described imaging apparatus uses a prism as a reflector element which bends an optical path, the prism can be replaced by a mirror, or the like, as a reflector element. Additionally, the present invention can also be applied to a type of imaging apparatus which has an L-shaped optical path without including a reflector element corresponding to the second prism L12 in the imaging optical system. Alternatively, the present invention can be applied to an imaging apparatus which contains a bending optical system including one or more additional reflector elements in addition to the first prism L11 and the second prism L12. In any case, the bending angle (reflecting angle) of an optical axis by a reflector element of the bending optical system can be any angle other than 90 degrees.

Although the first lens frame 30 is supported on the base member 31 via the guide shafts 41A, 41B and 41C in the above illustrated embodiment of the imaging apparatus, the first lens frame 30 can be supported by spherical guide balls, or the like, instead of the guide shafts 41A, 41B and 41C. Specifically, it is possible to replace the guide shafts 41A, 41B and 41C by three guide balls so that these guide balls are sandwiched between the first lens frame 30 and the base member 31 and so that the contact points of the three guide balls with the first lens frame 30 correspond to the support points 45A, 45B and 45C (the apexes of the aforementioned imaginary triangle). In this case, although the rolling of the guide balls on the first lens frame 30 causes the contact points between the guide balls and the first lens frame 30 to vary in position, within the range of movement of the first lens frame 30 relative to the base member 31, since the point of intersection E between the first plane H1 and the second plane H2, the center of gravity Z of the movable part (which includes the first lens frame 30) that moves to reduce image shake, members such as the movement limit projection 43 and the movement limit hole 53 which define the range of movement of the first lens frame 30, part of the permanent magnets 60 and 61, and part of the coils 62 and 63 all lie in the support intra-region, which is defined by an imaginary triangle (the apexes of which correspond to the contact points of the guide balls with the first lens frame 30), the above described effect is obtained. However, in the case of using guide balls instead of the guide shafts 41A, 41B and 41C, the imaging unit 10 would need to be modified so that the guide balls are sandwiched between the first lens frame 30 and that a biasing force is exerted on the first lens frame 30 so as to maintain this sandwiching state, thereby requiring an additional biaser to be installed for exerting this biasing force on the first lens frame 30. Accordingly, the above illustrated embodiment in which the first lens frame 30 can be supported using no biaser has the advantage of having a smaller number of components and thus capable of being made simpler in structure than the above described modified embodiment. In addition, the structure of the above illustrated embodiment of the imaging unit 10 is superior also in assembling workability because the state of supporting the first lens frame 30 is completed by inserting each guide shaft 41A, 41B and 41C into the elongated open groove T1 of the associated guide support portion 40A, 40B or 40C and the elongated open groove T2 of the associated slidable support portion 51A, 51B or 51C from a side thereof.

Additionally, although the inclination angles of the magnetic pole boundary lines Q1 and Q2 of the permanent magnets 60 and 61 with respect to the first reference plane P1 and the inclination angles of the long axes of the coils 62 and 63 with respect to the first reference plane P1 are each set to ±45 degrees in the above illustrated embodiment of the imaging apparatus, the above described effect can also be obtained even in the case of the inclination angles of the magnetic pole boundary lines Q1 and Q2 and/or the long axes of the coils 62 and 63 with respect to the first reference plane P1 being slightly changed.

Additionally, although the direction of action F1 of the driving force generated by the first actuator (a combination of the permanent magnet 60 and the coil 62) and the direction of action F2 of the driving force generated by the second actuator (a combination of the permanent magnet 61 and the coil 63) are orthogonal to each other in the above illustrated embodiment of the imaging apparatus, the present invention is applicable also to the case where the direction of action F1 and the direction of action F2 are not orthogonal to each other.

Additionally, although the point of intersection E between the first plane H1 and the second plane H2 and the center of gravity Z of the movable part (which includes the first lens frame 30) lies on the first reference plane P1 in the above illustrated embodiment of the imaging apparatus, the above described effect obtained by the above described structure of the imaging apparatus that satisfies the first condition (R1<R2) and the second condition (W1<W2) is still effective even if the point of intersection E or the center of gravity Z slightly deviates from the first reference plane P1.

Additionally, in the above illustrated embodiment of the imaging apparatus, the center U1 of the permanent magnet 60, the center U1 of the coil 62 and the center U3 of the magnetic sensor 65 lie in a common plane, i.e., the first plane H1 in the direction of action F1, while the center U2 of the permanent magnet 61, the center U2 of the coil 63 and the center U4 of the magnetic sensor 66 lie in a common plane, i.e., the second plane H2 in the direction of action F2. This structure is desirable in terms of the space efficiency of the arrangement of the magnetic sensors 65 and 66 relative to the electromagnetic actuator (the first actuator and the second actuator), which includes the permanent magnets 60 and 61 and the two coils 62 and 63, and a high accuracy of detecting the position of the first lens frame 30 using the magnetic sensors 65 and 66. However, the present invention can also be applied to an imaging apparatus equipped with an anti-shake system in which the center U1 of the permanent magnet 60, the center U1 of the coil 62 and the center U3 of the magnetic sensor 65 do not lie in a common plane in the direction of action F1 and while the center U2 of the permanent magnet 61, the center U2 of the coil 63 and the center U4 of the magnetic sensor 66 do not lie in a common plane in the direction of action F2. For instance, instead of the permanent magnets 60 and 61 in the above illustrated embodiment of the imaging apparatus, two narrow permanent magnets which are greater in length than the long axes of the coils 62 and 63 can be used, and two magnetic sensors corresponding to the magnetic sensors 65 and 66 can be disposed in the vicinity of ends of the two narrow permanent magnets in the lengthwise direction thereof, respectively. In this case, a plane (hereinafter referred to as a first plane H1') which extends in the direction of action F1 and passes through the center of the associated permanent magnet and a plane (hereinafter referred to as a second plane H2') which extends in the direction of action F2 and passes through the center of the associated permanent magnet do not coincide with the first plane H1 and the second plane H2, respectively. In this case also, an effect of enhancing the accuracy of detecting the position of the first lens frame 30 is obtained by making the distance R1 from the center of the swing pivot 44 to the first optical axis O1 smaller than a distance R2' from the center of the swing pivot 44 to a point of intersection E' between the first plane H1' and the second plane H2' (i.e., by satisfying the condition R1<R2').

Additionally, the above illustrated embodiment of the electromagnetic actuator is a moving-magnet electromagnetic actuator in which the permanent magnets 60 and 61 are supported by the movable first lens frame 30 and the coils 62 and 63 are supported by the immovable cover member 32. This type of electromagnetic actuator is superior in wiring routing for coils and magnetic sensors; however, the present invention is also applicable to a moving-coil electromagnetic actuator in which the coils 62 and 63 are supported by the first lens frame 30 that is movable and the permanent magnets 60 and 61 are supported by the base member 31 or the cover member 32 that is immovable. In such a case, it is advisable that the magnetic sensors 65 and 66 be also provided on the first lens frame 30.

Although each of the permanent magnets 60 and 61 has a substantially square shape in a front view and each of the coils 62 and 63 has an elongated shape, in a front view, that is elongated in a direction along the associated magnetic boundary line Q1 or Q2 in the above illustrated embodiment of the anti-shake system, the present invention can also be applied to an anti-shake system having permanent magnets and coils which are different in shape from the permanent magnets 60 and 61 and the coils 62 and 63.

Although the center U1 of the permanent magnet 60 and the center U1 of the coil 62 substantially coincide with each other in a plane orthogonal to the first optical axis O1 and the center U2 of the permanent magnet 61 and the center U2 of the coil 63 substantially coincide with each other in a plane orthogonal to the first optical axis O1 when the first lens frame 30 is positioned at the center of the moving range (anti-shake initial state) thereof in the above illustrated embodiment of the anti-shake system, the present invention can also be applied to an imaging apparatus equipped with an anti-shake system in which the center of each permanent magnet and the center of the associated coil do not coincide (are not aligned) with each other in the anti-shake initial state. In this case, it is advisable that the centers of the first actuator (60 and 62) and the second actuator (61 and 63) for the first lens frame 30 be determined as the centers of the two coils, respectively.

Although the second lens group G2, the third lens group G3 and the fourth lens group G4 are provided on the second optical axis O2 in the above illustrated embodiment of the imaging apparatus, the present invention can also be applied to an imaging optical system in which less than or more than three lens groups are provided on the second optical axis O2.

Additionally, in the first lens group G1, it is possible to change the number of lens elements arranged in front of the incident surface L11-a of the first prism L11 on the first optical axis O1 and the number of lens elements arranged on the right-hand side of the exit surface L11-b of the first prism L11 on the second optical axis O2. For instance, the first lens element L1 in the above illustrated embodiment can be replaced by two or more front lens elements which are arranged in front of the first prism L11. In such a case, the distances between the front lens elements arranged in front of the first prism L11 are small, and accordingly, to prevent the aberrations from deteriorating, it is advisable to perform anti-shake control by moving all the plurality of front lens elements, arranged in front of the first prism L11, in directions orthogonal to the first optical axis O1. Additionally, although the second lens element L2 is arranged on the right-hand side of the first prism L11 in the above illustrated embodiment, the number of lens elements in the first lens group G1 which are arranged on the optical path extending from the exit surface L11-b of the first prism L11 toward the second lens group G2 can be more than one. Additionally, it is possible to modify the first lens group G1 so as not to include any lens element on the optical path extending from the exit surface L11-b of the first prism L11 toward the second lens group G2.

The length of the optical path from the incident surface of the first lens element L1 to the image plane in the imaging unit 10 is constant at all times in the above described embodiment. In this type of imaging optical system, the first lens element L1 that is the closest to the object side is generally a negative lens element. However, the lens element (front lens element) for use in anti-shake control in the imaging apparatus according to the present invention can be a positive lens element. Regardless of whether the power of the front lens element is negative or positive, any lens element can be adopted as the front lens element as long as it has a refractive power.

Additionally, although the imaging optical system of the above illustrated embodiment of the imaging unit 10 is a zoom lens (variable power optical system) which performs a zooming operation (power varying operation) by moving the second lens group G2 and the third lens group G3 along the second optical axis O2, the present invention is also applicable to an imaging apparatus which incorporates an imaging optical system having no power varying capability. For instance, it is possible to modify the imaging unit 10 such that the second lens group G2 and the third lens group G3 do not move for a zooming operation and that the second lens group G2 or the third lens group G3 moves solely for a focusing operation.

Although the incident surface L11-a of the first prism L11 in the above illustrated embodiment of the imaging apparatus is in the shape of a laterally elongated rectangle, the present invention can also be applied to a type of imaging apparatus having a first prism (which corresponds to the first prism L11), the incident surface thereof having a different shape such as a square or a trapezoid.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. An imaging apparatus, comprising:
    a front lens group which constitutes part of an imaging optical system of said imaging apparatus and is provided at a fixed position with respect to an optical axis direction, wherein said front lens group includes at least one front lens element and a reflector element, in that order from an object side, and wherein light rays exiting from said front lens element along a first optical axis are reflected by said reflector element to travel along a second optical axis that is nonparallel to said first optical axis;
    at least one rear lens group which constitutes another part of said imaging optical system and is provided closer to an image plane than said front lens group; and
    an anti-shake system which drives said front lens element along a plane orthogonal to said first optical axis, in response to vibrations applied to said imaging optical system, to reduce image shake on said image plane,
    wherein said anti-shake system comprises:
    a base member which supports at least said reflector element of said front lens group;
    a movable frame which supports said front lens element of said front lens group and is supported to be movable relative to said base member along a plane orthogonal to said first optical axis;
    a guide portion which guides said movable frame relative to said base member so as to allow said movable frame to move back and forth in a predetermined linear direction and rotate about a predetermined rotational axis; and
    a first actuator and a second actuator which generate a driving force for moving said movable frame in a first direction and in a second direction, respectively, said first direction and said second direction intersecting each other in said plane orthogonal to said first optical axis,
    wherein a first section and a second section are defined on either side of a second reference plane, which passes through said first optical axis and is orthogonal to a first reference plane in which said first optical axis and said second optical axis lie, said second optical axis extending in said second section, wherein said first section is positioned on the opposite side of said second reference plane to that in which said second optical axis extends,
    wherein, as viewed along said first optical axis, said first actuator and said second actuator are positioned in said first section while said rotational axis of said guide portion is positioned in said second section,
    wherein a first plane, which is parallel to said first optical axis and extends in said first direction of said driving force of said first actuator while passing through a center of said first actuator, and a second plane, which is parallel to said first optical axis and extends in said second direction of said driving force of said second actuator while passing through a center of said second actuator, intersect each other at a predetermined point of intersection, as viewed along said first optical axis, wherein said point of intersection is located at a different position from that of said first optical axis, and
    wherein a distance from said rotational axis of said guide portion to said point of intersection is greater than a distance from said rotational axis of said guide portion to said first optical axis, as viewed along said first optical axis.

2. The imaging apparatus according to claim 1, wherein a distance from said point of intersection to said center of gravity of said movable frame is smaller than a distance from said point of intersection to said first optical axis.

3. The imaging apparatus according to claim 2, wherein said point of intersection and said center of gravity of said movable frame lie on said first reference plane.

4. The imaging apparatus according to claim 3, wherein said point of intersection is located closer to said first optical axis than said center of gravity of said movable frame in said first reference plane.

5. The imaging apparatus according to claim 1, wherein said first actuator comprises a first voice coil motor which includes a first coil and a first permanent magnet which are mounted to one and the other of said base member and said movable frame, respectively, said first voice coil motor generating a driving force in a direction orthogonal to a magnetic pole boundary line of said first magnet upon said first coil being energized, and wherein said second actuator comprises a second voice coil motor which includes a second coil and a second permanent magnet which are mounted to one and the other of said base member and said movable frame, respectively, said second voice coil motor generating a driving force in a direction orthogonal to a magnetic pole boundary line of said second permanent magnet upon said second coil being energized.

* * * * *